US007920756B2

(12) United States Patent
Tanaka et al.

(10) Patent No.: US 7,920,756 B2
(45) Date of Patent: Apr. 5, 2011

(54) IMAGE BLUR DETECTION USING CUMULATIVE BLUR WIDTHS

(75) Inventors: Takashige Tanaka, Matsumoto (JP); Ayahiro Nakajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 944 days.

(21) Appl. No.: 11/825,094

(22) Filed: Jul. 2, 2007

(65) Prior Publication Data

US 2008/0008398 A1    Jan. 10, 2008

(30) Foreign Application Priority Data

Jul. 4, 2006  (JP) ................. 2006-184300

(51) Int. Cl.
  G06K 9/48  (2006.01)
  G06K 9/36  (2006.01)
  G06K 9/40  (2006.01)
  G06K 9/46  (2006.01)
(52) U.S. Cl. ........ 382/275; 382/199; 382/232; 382/266
(58) Field of Classification Search .................. 382/199, 382/232, 255, 266, 275
  See application file for complete search history.

(56) References Cited

U.S. PATENT DOCUMENTS

| 7,391,920 | B2* | 6/2008 | Abe .................... 382/266 |
| 7,596,273 | B2* | 9/2009 | Aoyama ............... 382/199 |
| 7,668,389 | B2* | 2/2010 | Kitamura et al. ..... 382/255 |
| 7,720,302 | B2* | 5/2010 | Aoyama ............... 382/255 |
| 2007/0071346 | A1* | 3/2007 | Li et al. ............ 382/254 |

FOREIGN PATENT DOCUMENTS

| JP | 04-170872 | 6/1992 |
| JP | 10-271516 | 10/1998 |
| JP | 2002-051178 | 2/2002 |

OTHER PUBLICATIONS

Abstract of Japanese Patent Publication No. 04-170872, Pub. Date: Jun. 18, 1992, Patent Abstracts of Japan.
Abstract of Japanese Patent Publication No. 10-271516, Pub. Date: Oct. 9, 1998, Patent Abstracts of Japan.
Abstract of Japanese Patent Publication No. 2002-051178, Pub. Date: Feb. 15, 2002, Patent Abstracts of Japan.

* cited by examiner

*Primary Examiner* — Bhavesh M Mehta
*Assistant Examiner* — Stephen R Koziol
(74) *Attorney, Agent, or Firm* — Martine Penilla & Gencarella, LLP

(57) ABSTRACT

A printer fetches a horizontal direction DCT coefficient group and a vertical direction DCT coefficient group for each block from the JPEG data. The printer selects edge patterns similar to the brightness changes expressed by these coefficient groups from a specified table, and records those pattern numbers in a RAM. The printer judges whether or not the brightness changes of the blocks with each other adjacent are continuous based on the pattern number of each block recorded in the RAM. And by connecting the edge patterns when those brightness changes are continuous, the printer accumulates the blur widths that exist extending over the blocks. Then, based on this cumulative value, the printer determines the presence or absence of image blur. It is possible thereby to detect with good precision the blur of images even for high resolution images while reducing the used memory capacity.

16 Claims, 19 Drawing Sheets

HORIZONTAL EDGE PATTERN

VERTICAL EDGE PATTERN

EDGE PATTERN TABLE

| PATTERN NUMBER | BRIGHTNESS PATTERN (* REFERENCE) | BASIC EDGE PATTERN (DCT COEFFICIENT AFTER NORMALIZATION) | EDGE WIDTH | | |
|---|---|---|---|---|---|
| | | | LW | MW | RW |
| A1 |  |  | 0 | 1 | 5 |
| A2 |  |  | 0 | 2 | 4 |
| A3 |  |  | 0 | 3 | 3 |
| A4 |  |  | 0 | 4 | 2 |
| ⋮ | ⋮ | ⋮ | ⋮ | ⋮ | ⋮ |
| A14 |  |  | 2 | 3 | 1 |
| A15 |  |  | 1 | 4 | 1 |
| A16 |  |  | 1 | 5 | 0 |
| B1 | ⋮ | ⋮ | ⋮ | ⋮ | ⋮ |
| ⋮ | ⋮ | ⋮ | ⋮ | ⋮ | ⋮ |

NORMALIZATION BRIGHTNESS DIFFERENCE TABLE

| PATTERN NUMBER (n=A,B,C,D) | NORMALIZATION BRIGHTNESS DIFFERENCE VALUE NY |
|---|---|
| n1 | 6.5 |
| n2 | 5.4 |
| n3 | 4.7 |
| n4 | 4.3 |
| ⋮ | ⋮ |
| n16 | 3.5 |

| | WINDOW | | | | | | | | SUB WINDOW BUFFER | | |
|---|---|---|---|---|---|---|---|---|---|---|---|
| LINE 1 | 0 | 0 | 0 | 0 | 0 | 0 | 0 | 0 | ... | 0 | 0 |
| LINE 2 | 0 | 0 | 0 | 0 | 0 | 0 | 0 | 0 | ... | 0 | 0 |
| LINE 3 | 0 | 0 | 0 | 0 | 0 | 0 | 0 | 0 | ... | 0 | 0 |
| LINE 4 | 3 | 0 | 0 | 0 | 0 | 0 | 0 | 0 | ... | 0 | 0 |

Fig.23B

| LINE 1 | 0 | 0 | 0 | 0 | 0 | 0 | 0 | 0 | ... | 0 | 0 |
|---|---|---|---|---|---|---|---|---|---|---|---|
| LINE 2 | 0 | 0 | 0 | 0 | 0 | 0 | 0 | 0 | ... | 0 | 0 |
| LINE 3 | 0 | 0 | 0 | 0 | 0 | 0 | 0 | 0 | ... | 0 | 0 |
| LINE 4 | 3 | 4 | 0 | 0 | 0 | 0 | 0 | 0 | ... | 0 | 0 |

Fig.23C

| LINE 1 | 0 | 0 | 0 | 0 | 0 | 0 | 0 | 0 | ... | 0 | 0 |
|---|---|---|---|---|---|---|---|---|---|---|---|
| LINE 2 | 0 | 0 | 0 | 0 | 0 | 0 | 0 | 0 | ... | 0 | 0 |
| LINE 3 | 0 | 0 | 0 | 0 | 0 | 0 | 0 | 0 | ... | 0 | 0 |
| LINE 4 | 3 | 4 | 2 | 5 | 0 | 0 | 0 | 0 | ... | 0 | 0 |

Fig.23D

| LINE 1 | 0 | 0 | 0 | 0 | 0 | 0 | 0 | 0 | ... | 0 | 0 |
|---|---|---|---|---|---|---|---|---|---|---|---|
| LINE 2 | 0 | 0 | 0 | 0 | 0 | 0 | 0 | 0 | ... | 0 | 0 |
| LINE 3 | 0 | 0 | 0 | 0 | 0 | 0 | 0 | 0 | ... | 0 | 0 |
| LINE 4 | 3 | 4 | 2 | 5 | 1 | 0 | 0 | 0 | ... | 0 | 0 |

Fig.23E

| LINE 1 | 0 | 0 | 0 | 0 | 0 | 0 | 0 | 0 | ... | 0 | 0 |
|---|---|---|---|---|---|---|---|---|---|---|---|
| LINE 2 | 0 | 0 | 0 | 0 | 0 | 0 | 0 | 0 | ... | 0 | 0 |
| LINE 3 | 3 | 4 | 2 | 5 | 1 | 1 | 10 | 11 | 3 ... | 2 | 3 |
| LINE 4 | 0 | 0 | 0 | 0 | 0 | 0 | 0 | 0 | ... | 0 | 0 |

Fig.23F

| LINE 1 | 0 | 0 | 0 | 0 | 0 | 0 | 0 | 0 | ... | 0 | 0 |
|---|---|---|---|---|---|---|---|---|---|---|---|
| LINE 2 | 0 | 0 | 0 | 0 | 0 | 0 | 0 | 0 | ... | 0 | 0 |
| LINE 3 | 3 | 4 | 2 | 5 | 1 | 1 | 10 | 11 | 3 ... | 2 | 3 |
| LINE 4 | 2 | 0 | 0 | 0 | 0 | 0 | 0 | 0 | ... | 0 | 0 |

IMAGE BLUR DETECTION USING CUMULATIVE BLUR WIDTHS

CLAIM OF PRIORITY

The present application claims the priority based on Japanese Patent Applications No. 2006-184300 filed on Jul. 4, 2006, the disclosures of which are hereby incorporated by reference in its entirety.

BACKGROUND

1. Technical Field

The present invention relates to technology for detecting image blur.

2. Related Art

In recent years, digital still cameras have become widespread, and the capacity of the memory cards used for these has also increased. Because of this, the opportunity for general users to shoot large volumes of images has increased. With digital still cameras, there is no need to change film, and since shooting is performed easily, there is a good deal of shooting images without being conscious of subject shaking or hand shaking. Therefore, when trying to print the shot images on a printer, there are a relatively large number of images for which blurring has occurred with the image due to subject shaking or hand shaking, and it was necessary to do the work of selecting proper images ahead of time.

The work of selecting proper images from among a large volume of images is a very troublesome task. In light of this, to handle this kind of problem, there is a desire for technology that automatically eliminates from the printing subjects the images for which blur has occurred before the user prints the images. Regarding this kind of blur detection technology, noted in JP-A-4-170872 is a technology that determines the sharpness (in other words, the level of blurriness) of images for each block by performing a frequency analysis for each block that has undergone discrete cosine transform after the shot image is divided into a plurality of blocks with units of 8 pixels×8 pixels (as technology related to this application, also see JA-A-10-271516 and JP-A-2002-51178).

However, the resolution of images shot using the digital still cameras of recent years is high resolution of from several million to tens of millions of pixels, so it was difficult to determine the blur or sharpness within just a block constituted by 8 pixels×8 pixels as noted in JP-A-4-170872. To put this in specific terms, when printing an image of 6,000,000 pixels (approximately horizontal 3000 pixels×vertical 2000 pixels) on an L size printing paper (approximately horizontal 130 mm×vertical 90 mm), a width of the block nearly equivalent to 0.35 mm, and within this kind of narrow width, it is difficult to objectively determine whether an image is sharp or blurry. In other words, with the high resolution images shot in recent years, directly applying the technology noted in JP-A-4-170872 is difficult.

Also, when trying to analyze the blur of high resolution images of several million pixels or greater using the technology noted in JP-A-4-170872, the calculation volume is huge, and along with this, a large volume of memory is used. This kind of problem is a problem that particularly cannot be overlooked when performing blur detection with compact devices which have limits in terms of CPU power and memory capacity such as printers, digital cameras, photo viewers, and the like.

SUMMARY

Considering the various problems noted above, An advantage of some aspects of the invention is to detect image blur with good precision even with high resolution images while reducing the used memory volume.

According to an aspect of the invention, there is provided an image processing device for detecting the blur of an image constituted as a collection of blocks consisting of a plurality of pixels, the image processing device comprising: an image data input unit that inputs image data constituted by recording for each of the blocks a coefficient obtained by converting a space area to a frequency area performed using the blocks as a unit; an edge pattern storage unit that stores correlated to each other a basic edge pattern for which a gradient shape representative of the change in the pixel values within the block is expressed by the coefficient, and a pattern number uniquely allocated to the basic edge pattern; a coefficient extraction unit that extracts a coefficient group that express frequency elements of a specified direction from each block of the input image data; a pattern matching unit that selects from the edge pattern storage unit the basic edge pattern similar to the gradient shape expressed by the extracted coefficient group; a pattern number storage unit that stores the pattern number corresponding to the selected basic edge pattern, wherein the pattern number is associated with the block; and a blur width detection unit that references the pattern number stored in the pattern number storage unit; and detects as the blur width the range for which the basic edge pattern gradient direction matches along the series of the blocks within the image.

According to the image processing device, coefficient groups representing specified direction frequency elements are extracted for each block constituting the image data, a basic edge pattern similar to the gradient shape of the pixel value represented by this coefficient group is selected from the edge pattern storage unit, and that pattern number is stored in the pattern number storage unit. Then, based on this pattern number, the connection status of the basic edge pattern along the series of blocks is determined, and the range for which the basic edge pattern gradient direction matches is detected as the blur width. Therefore, even when the blur width exceeds the size of one block, it is possible to judge whether or not an image is blurry with good precision.

Also, as described above, with the image processing device, for determining whether or not the basic edge pattern gradient direction between adjacent blocks matches, rather than using the coefficient recorded in the image data, the pattern number of the basic edge pattern similar to the gradient shape expressed by that coefficient is used. Therefore, it is possible to significantly shorten the processing time, and to dramatically reduce the used memory capacity. For example, if the pattern number associated with a certain block is the number of the basic edge pattern that expresses a right downward gradient, and the pattern number associated with that adjacent block is also the number of a basic edge pattern expressing a right downward gradient, it is possible to judge that the gradient direction between these blocks matches. Note that "the gradient direction matches" does not go so far as to mean that the gradient angle matches. If the slant code matches, then the gradient direction matches.

Note that, with the image processing device, image data for which are recorded coefficients obtained by conversion from space area to frequency area for each block is input, and as this kind of image data, for example, there is JPEG format image data.

Besides the aspect of the image processing device described above, the invention could also take the aspect of a blur detection method, or a computer program product for detecting image blur. The computer program may be recorded on a computer-readable recording medium. Media of various kinds, such as a flexible disk, CD-ROM, DVD-ROM, magnetooptical disk, memory card, or hard disk, may be used as recording media.

These and other objects, features, aspects, and advantages of the present invention will become more apparent from the following detailed description of the preferred embodiments with the accompanying drawings.

BRIEF DESCRIPTION OF THE DRAWINGS

FIG. 15 is an explanatory drawing showing an example of the normalization brightness difference table.

FIG. 23A through 23F are explanatory drawings showing the window area moving method and the focused block count tabulation method.

DESCRIPTION OF THE PREFERRED EMBODIMENT

The present invention is explained in the following sequence based on embodiments.

Figure 1:
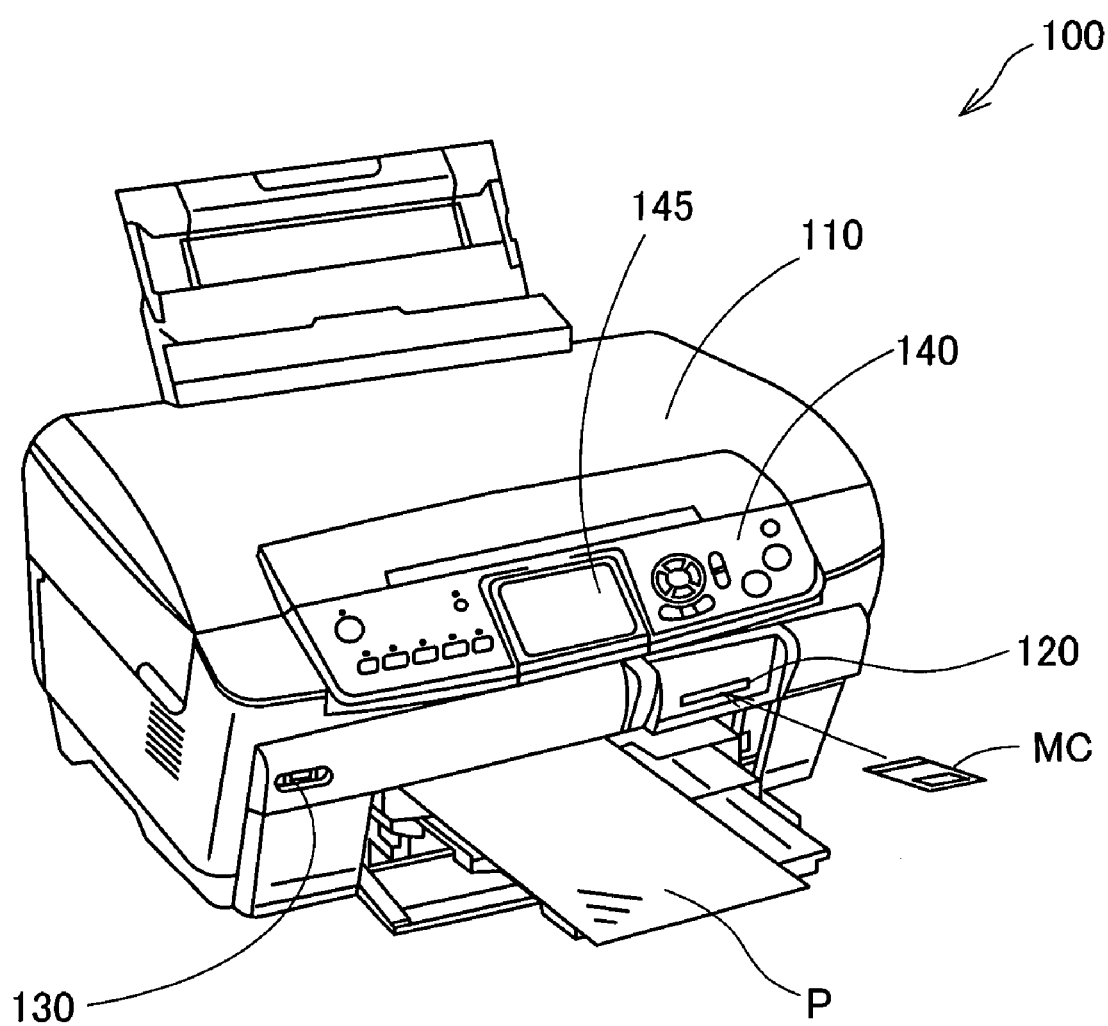
FIG. 1 is an explanatory drawing showing the external view of the printer as an embodiment.

A. Printer Hardware Constitution:
B. Printer Function Constitution:
C. Printing Process:
D. Blur Determination Process:
E. Edge Pattern Matching Process:
F. Edge Connection Process:
G. Block Blur Determination Process:
H. Window Blur Determination Process:
I. Effect:
J. Other Aspects:

A. Printer Hardware Constitution:

FIG. 1 is an explanatory drawing showing the external appearance of a printer 100 as an embodiment of the image processing device. The printer 100 is a multifunction printer, and is equipped with a scanner 110 that scans images optically, a memory card slot 120 for inserting a memory card MC on which image data is recorded, a USB interface 130 that connects equipment such as a digital camera or the like. The printer 100 is able to print images scaned by the scanner 110, images read from the memory card MC, and images read from a digital camera via the USB interface 130 on printing paper P. It is also possible to perform printing of images input from a personal computer connected by a printer cable or USB cable.

The printer 100 is equipped with an operating panel 140 for performing various operations related to printing. A liquid crystal display 145 is equipped in the center of the operating panel 140. This liquid crystal display 145 is used for display of images read from the memory card MC, digital cameras and the like, and display of GUI (Graphical User Interface) when using various functions of the printer 100.

The printer 100 has the function of removing blurred images from among the plurality of image data input from the memory card MC, the digital camera or the like, extracting only the focused images for which focus is good in at least one place, and displaying them on the liquid crystal display 145. The user is in this way able to print only the images suitable for printing by selecting the desired images from among the images displayed on the liquid crystal display 145. Following, described in detail are the constitution and process of the printer 100 for realizing the function of removing blurred images.

Figure 2:
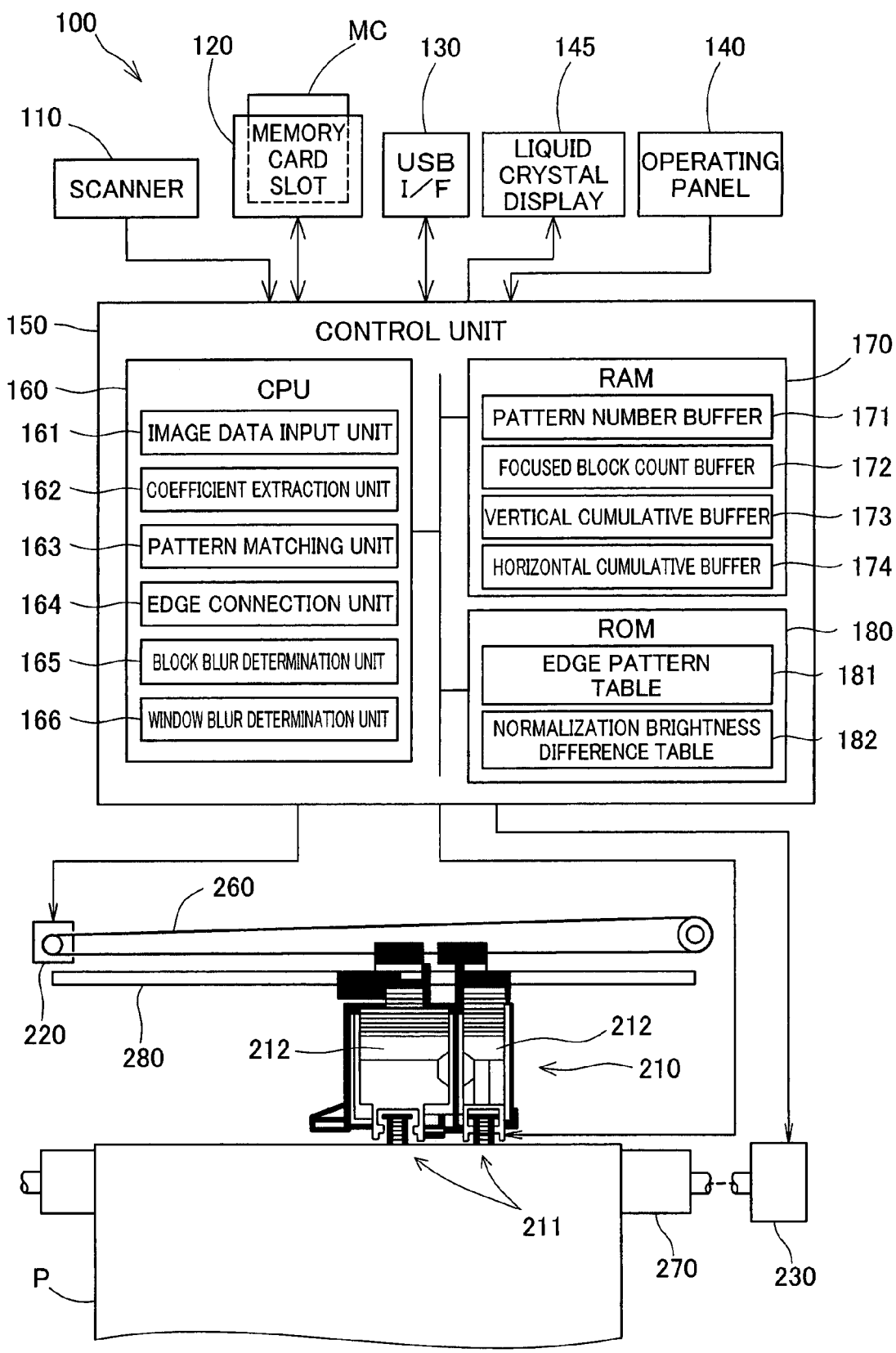
FIG. 2 is an explanatory drawing showing the internal constitution of the printer.

FIG. 2 is an explanatory drawing showing the internal constitution of the printer 100. As shown in the drawing, as a mechanism for performing printing on the printing paper P, the printer 100 is equipped with a carriage 210 that incorporates an ink cartridge 212, a carriage motor 220 that drives the carriage 210 in the main scan direction, a paper feed motor 230 that transports the printing paper P in the sub scan direction.

The carriage 210 is equipped with a total of six types of ink heads 211 corresponding to each ink that express the colors of cyan, magenta, yellow, black, light cyan, and light magenta. The ink cartridges 212 containing these inks are attached on the carriage 210, and the ink delivered from the ink cartridges 212 to the ink heads 211 is ejected onto the printing paper P by means of actuating piezo elements.

The carriage 210 is held to move freely on the sliding axis 280 installed in parallel with the axial direction of the platen 270. The carriage motor 220 rotates the drive belt 260 according to instructions from a control unit 150 to move the carriage 210 back and forth parallel to the axial direction of the platen 270, specifically, in the main scan direction. The paper feed motor 230 transports the printing paper P perpendicular to the axial direction of the platen 270 by rotating the platen 270. In other words, the paper feed motor 230 is able to move the carriage 210 relatively in the sub scan direction.

The printer 100 is equipped with the control unit 150 for controlling the operation of the ink head 211, the carriage motor 220, and the paper feed motor 230 described above. Connected to the control unit 150 are the scanner 110, the memory card slot 120, the USB interface 130, the operating panel 140, and the liquid crystal display 145 shown in FIG. 1.

The control unit 150 comprises a CPU 160, a RAM 170, and a ROM 180. Stored in the ROM 180 is a control program for controlling the operation of the printer 100, and further stored are an edge pattern table 181 and a normalization brightness difference table 182 used for various processes described later.

The CPU 160 loads into the RAM 170 the control program stored in the ROM 180 and executes it in order to operate as each of the illustrated function units (161 to 166). In the RAM 170, in addition to a work area for executing the control program, respectively secured are storage areas called the pattern number buffer 171, the focused block count buffer 172 (corresponds to the tabulated value storage unit of this application), a vertical cumulative buffer 173, and a horizontal cumulative buffer 174.

B. Printer Function Constitution:

The control unit 150 is equipped with an image data input unit 161, a coefficient extraction unit 162, a pattern matching unit 163, an edge connection unit 164, a block blur determination unit 165, and a window blur determination unit 166 as the function units realized by the CPU 160. Following, a brief description is given of the working of each of these functional units (for the detailed working, see the contents of each type of process described later).

The image data input unit 161 inputs JPEG format image data (hereafter referred to as "JPEG data") from the memory card MC or a digital camera via the memory card slot 120 or the USB interface 130. In the JPEG data are arranged blocks called 8 pixel×8 pixel MCU (Minimum Coded Unit) in series in the horizontal direction and vertical direction (in other words, for each line). The image data in each of these blocks have the data volume compressed by performing in sequence (1) pixel value color conversion from RGB color space to YCbCr color space, (2) DCT (Discrete Cosine Transform) conversion from a spatial area to a frequency area, (3) quantization that reduces the data information volume, and (4) Huffman encoding which is one type of entropy encoding.

Figure 3:
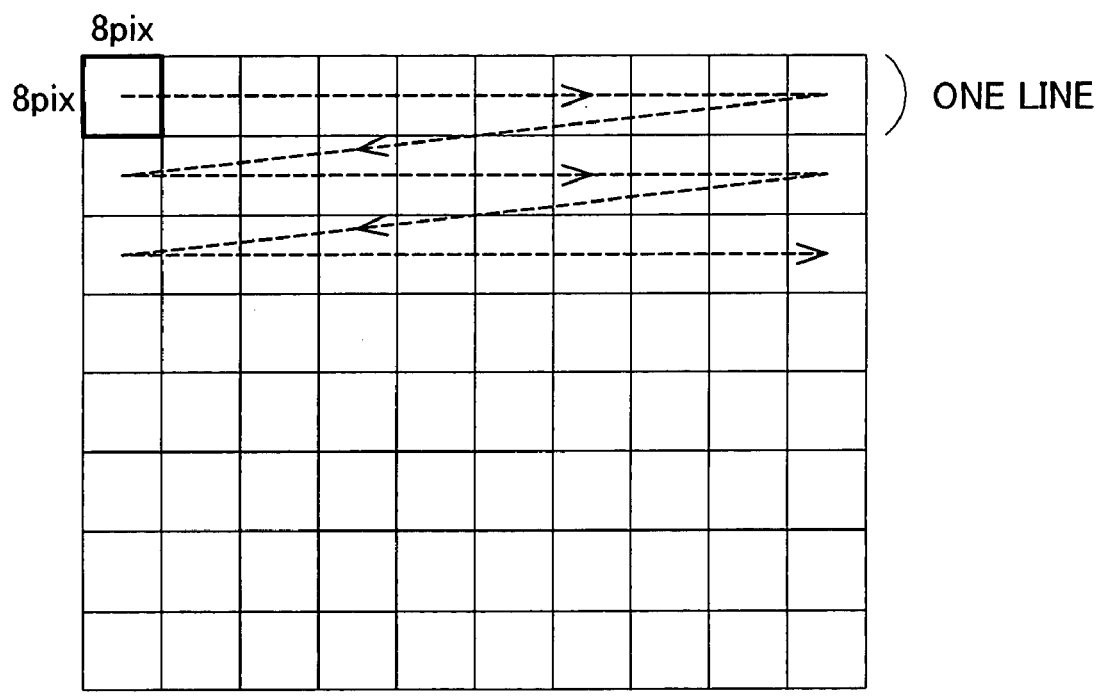
FIG. 3 is an explanatory drawing showing the state of each block within the JPEG data being recorded for each line.
Figure 4:
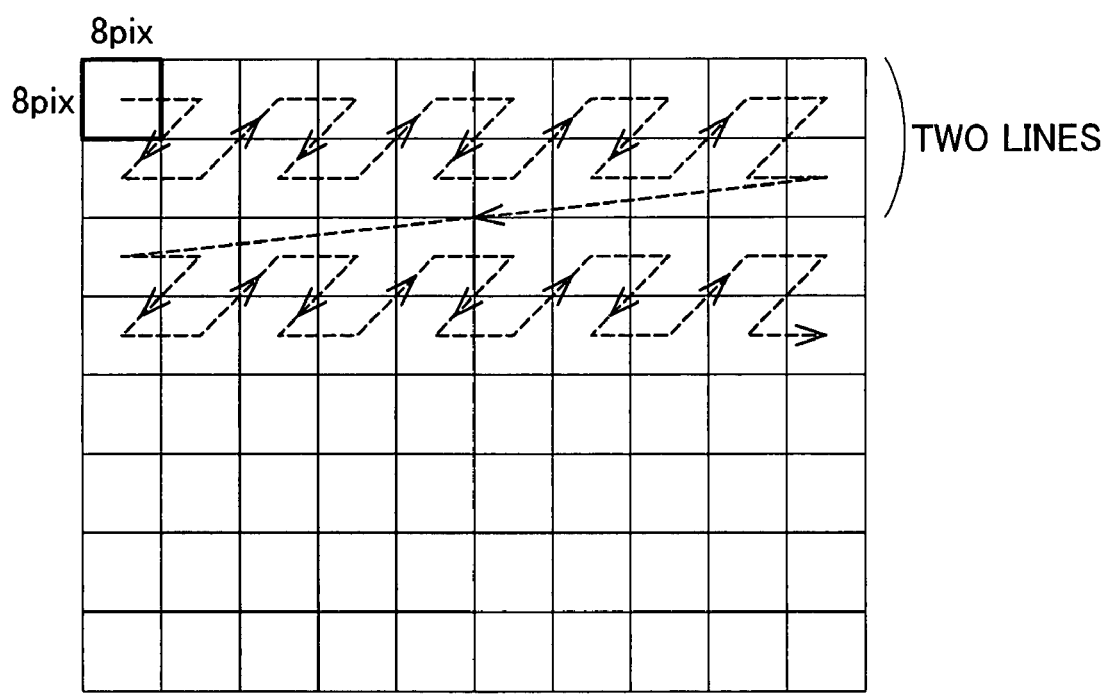
FIG. 4 is an explanatory drawing showing the state of each block within the JPEG data being recorded for each two lines.

FIG. 3 and FIG. 4 are explanatory drawings showing the sequence in which each block of data is recorded in the JPEG data. FIG. 3 represents the state of each block being recorded for each one line, and FIG. 4 represents the state of each block being recorded for each two lines. When blocks are stored for each two lines, as shown in FIG. 4, each block is recorded from the furthest upper left of the image, described continuously in sequence right, lower left, right, upper right, like the alphabet letter "Z." In the header information of the JPEG data, of these, recorded is information showing in which sequence the blocks are recorded. Note that in the JPEG data, there are items for which the data of each block is recorded using another recording sequence, but with this embodiment, only JPEG data for which data is recorded using the two types of recording sequence described above are handled. Also, with this embodiment, each block series direction is consistently the horizontal direction and vertical direction, and the series direction and the block recording sequence are different.

The coefficient extraction unit 162 performs reverse Huffman encoding and reverse quantization of the JPEG data described above for each block, and fetches the DCT coefficient. The coefficient extraction unit 162 further extracts from within the fetched 8×8 DCT coefficients a first coefficient group representing the horizontal direction AC frequency element and a second coefficient group representing the vertical direction AC frequency element.

Figure 5A:
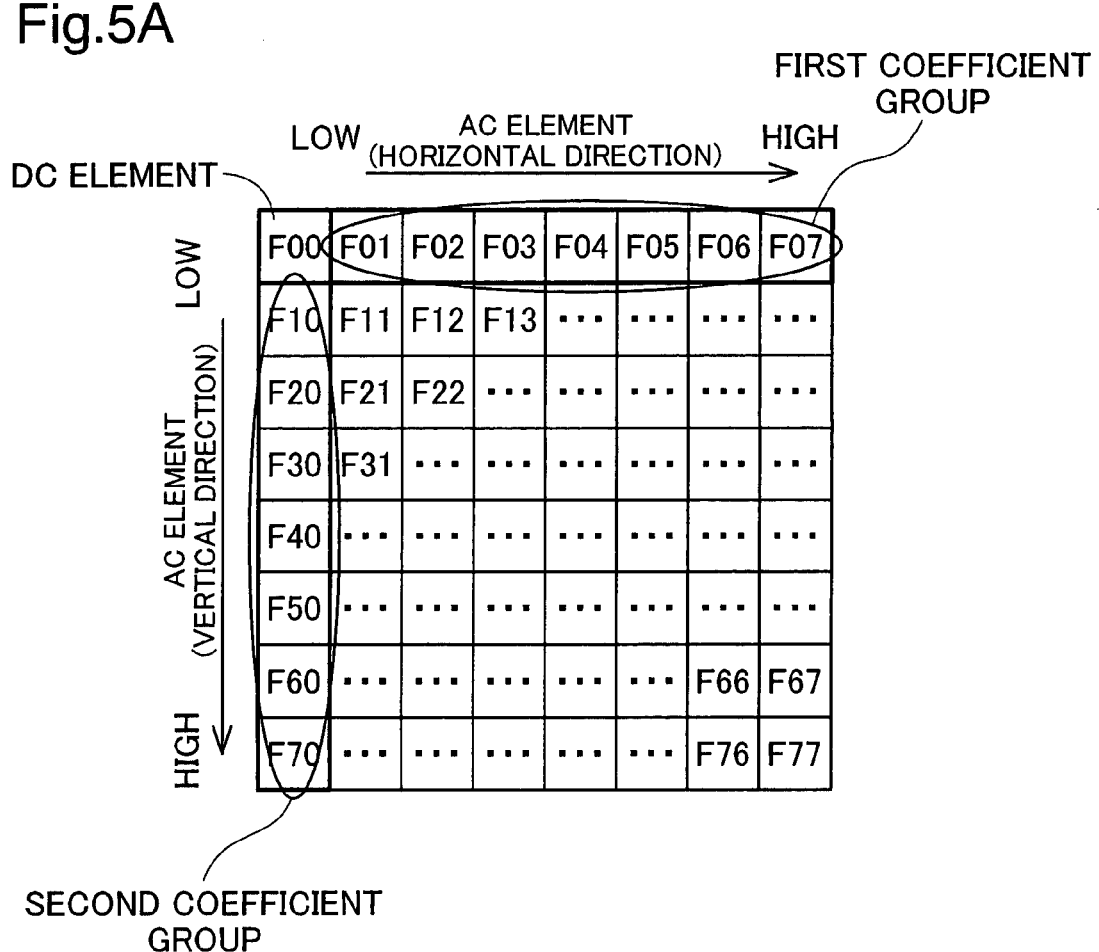
FIGS. 5A through 5C are explanatory drawings showing the DCT coefficients extracted by the coefficient extraction unit 162.
Figure 5B:
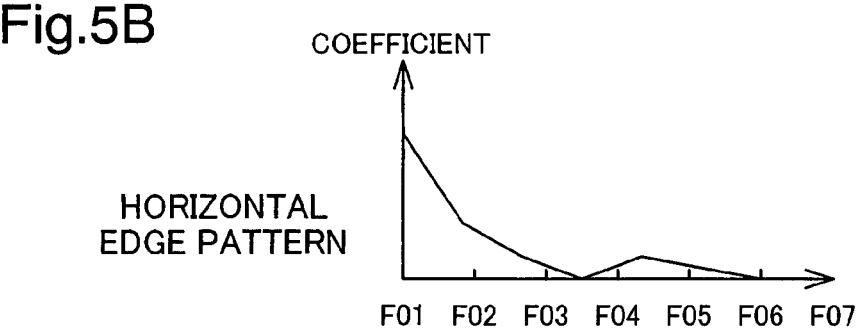
Figure 5C:
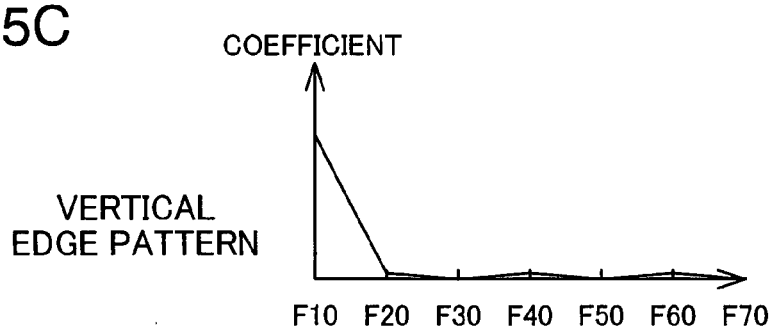

FIGS. 5A through 5C are explanatory drawings showing the DCT coefficients extracted by the coefficient extraction unit 162. As shown in FIG. 5A, from each block, at the stage when reverse quantization is performed, a total of 64 DCT coefficients from F00 to F77 are obtained. Of these, the coefficient F00 which exists at the furthest upper left is called the DC element, and the other coefficients are called the AC elements. Of these, the coefficient extraction unit 162 extracts as the first coefficient group the coefficients F01 to F07 which are the AC elements only in the horizontal direction (see FIG. 5B), and extracts as the second coefficient group the coefficients F10 to F70 which are the AC elements only of the vertical direction (see FIG. 5C).

The pattern matching unit 163 matches the edge pattern table 181 stored in the ROM 180 with the first coefficient group and the second coefficient group extracted by the coefficient extraction unit 162, and selects the basic edge pattern of the shape similar to the brightness change represented by the first coefficient group and the second coefficient group from the edge pattern table 181. With this embodiment, the "edge pattern" means the pattern representing the gradient shape of the brightness change within the block. The detailed constitution of the edge pattern table 181 will be described later, but in this edge pattern table 181, for the 64 types of basic edge pattern, the values of the DCT coefficient groups representing that gradient shape and pattern numbers are correlated and recorded. FIG. 5B shows an example of selection of the basic edge pattern similar to the brightness change of the horizontal direction represented by the first coefficient group, and FIG. 5C shows an example of selection of the basic edge pattern similar to the brightness change of the vertical direction represented by the second coefficient group. When the pattern matching unit 163 selects the basic edge pattern in this way, the pattern number of the selected basic edge pattern is recorded for each block in the pattern number buffer 171 in the RAM 170.

The edge connection unit 164 performs the process of connecting the blurry part width (hereafter referred to as the "blur width") when there is a blurred contour part that extends across a plurality of blocks. This edge connection unit 164 correlates to the "blur width detection unit" of this application.

Figure 6A:
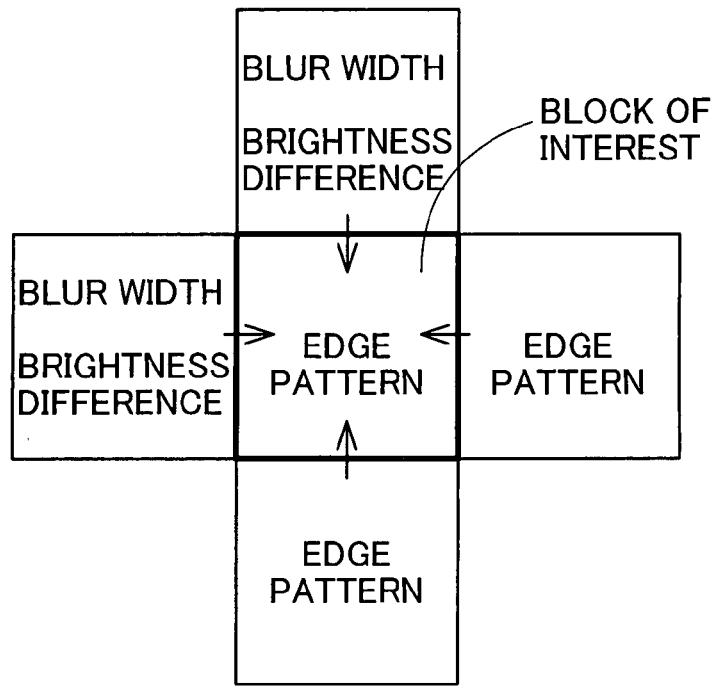
FIGS. 6A and 6B are explanatory drawings showing the concept of connecting the blur widths of the block of interest and the blocks adjacent to this.
Figure 6B:
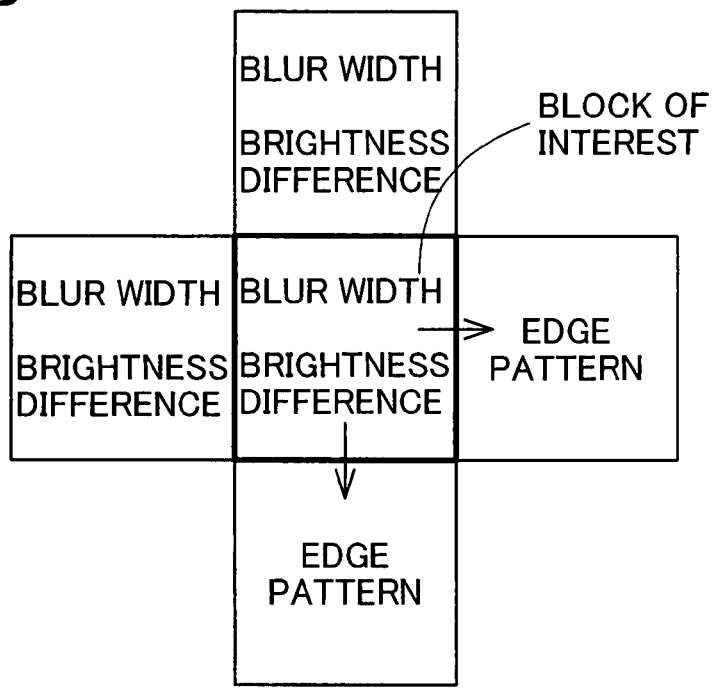

FIGS. 6A and 6B are explanatory drawings showing the concept of connecting the blur widths of the block of interest and of the blocks adjacent to it. With this embodiment, as shown in FIG. 6A, a judgment is made of whether the brightness change gradients of these blocks are continuous in the same direction based on the basic edge patterns selected for the block of interest and the shape of the basic edge pattern selected for the blocks adjacent at the right side and bottom side. Then, when they are continuous, the blur width and brightness difference of the top side and left side adjacent blocks are sequentially accumulated, and when they are not continuous, it is judged that the block of interest is the end part of the brightness change, and performed is the process of deciding the blur width and the brightness difference thereof. Specifically, with this embodiment, when the image blur width exceeds the size of one block (8×8 pixels), that blur width is cumulatively added, and when the block that is the terminal end of the blur is reached, based on that cumulative added value (hereafter referred to as the "cumulative blur width CW"), a judgment is made of whether that block is focused or blurred. When the blur width is cumulatively added for the block of interest, as shown in FIG. 6B, that value is referenced when calculating the blur width of the right side and bottom side block. Note that the edge connection unit 164 has a function of cumulatively adding not only the blur width but also the brightness difference within a block, and improving the precision of the determination of the presence or absence of blur using this value.

The block blur determination unit 165 determines whether or not the block is blurred for each block. In specific terms, of the cumulative blur width CW in the horizontal direction and vertical direction decided by the edge connection unit 164, using the cumulative blur width CW with the larger value, when this blur width exceeds a specified threshold value, The block blur determination unit 165 determines that the block is blurred.

The window blur determination unit 166 determines whether or not the window area constituted by a plurality of blocks is blurred. With the description below, focused window areas are called "focused windows," and blurred window areas are called "blurred windows."

Figure 7:
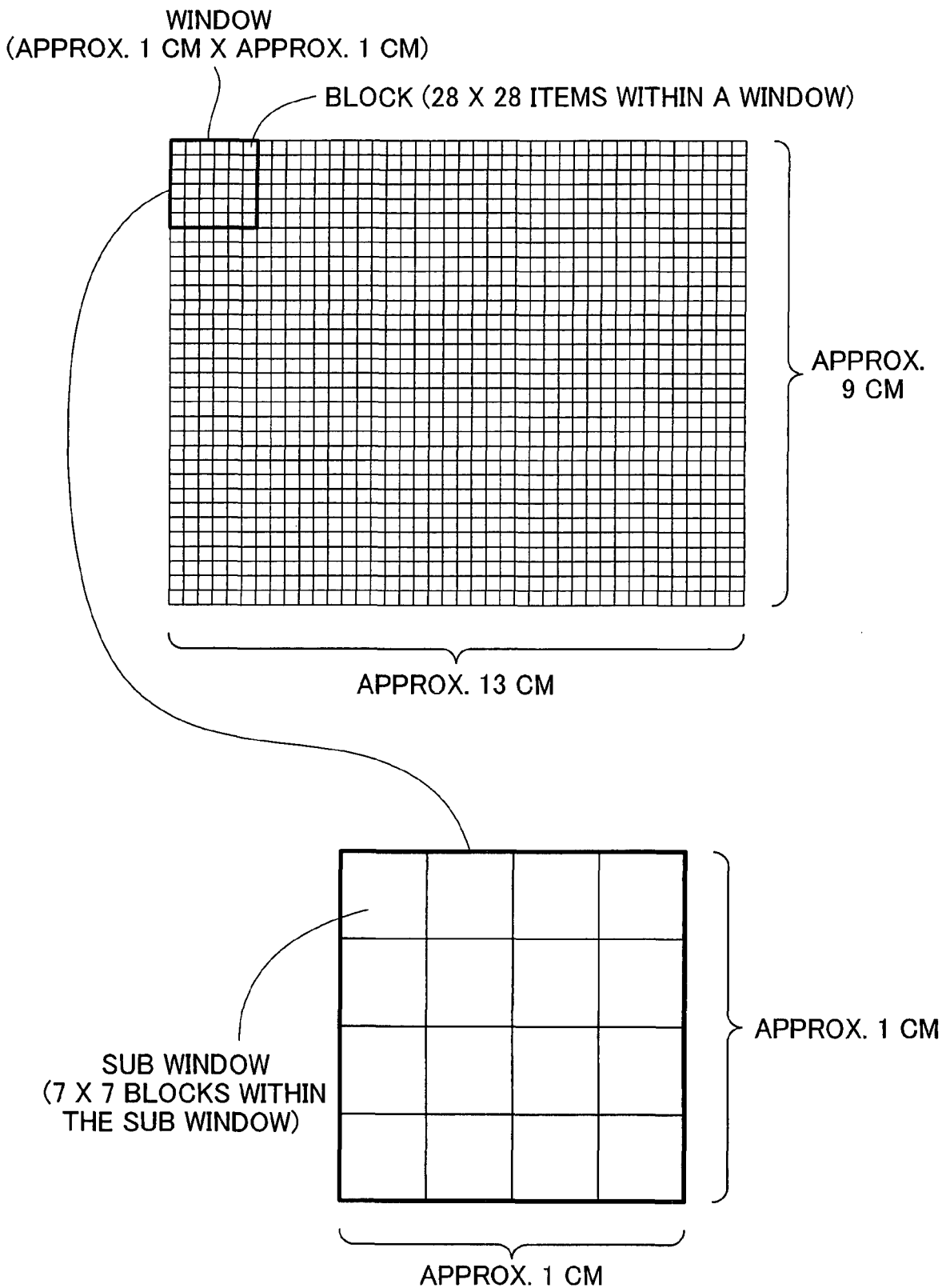
FIG. 7 is an explanatory drawing showing the concept of the window area.

FIG. 7 is an explanatory drawing showing the window area concept. With this embodiment, the window area expresses an area of size 1 cm×1 cm assumed as the minimum focused area for an L size printing paper. If the window area is focused even in one location at any place within the L size printing paper, the window blur determination unit 166 determines the image is the focused image. L size printing paper is the size approximately horizontal 13 cm×vertical 9 cm. When an image of 6,000,000 pixels (horizontal approximately 3000 pixels×vertical approximately 2000 pixels) is printed on this paper, the size of one 8 pixel×8 pixel block is approximately 0.35 mm×0.35 mm. Because of that, approximately 28×28 blocks exist within one window area.

As shown in FIG. 7, the window area is partitioned into 4×4 areas called sub window areas. The window blur determination unit 166 judges which of the window areas within the image are focused by moving the window area position in these sub window area units. With the example described above, there are 28×28 blocks within one window area, so there are 7×7 blocks within this sub window area.

Note that with this embodiment, as described above, the block count and window size are stipulated assuming that an image of 6,000,000 pixels will be printed on an L size printing paper, but the values of these parameters are of course changed as appropriate according to the printing subject paper size and image resolution.

Figure 8:
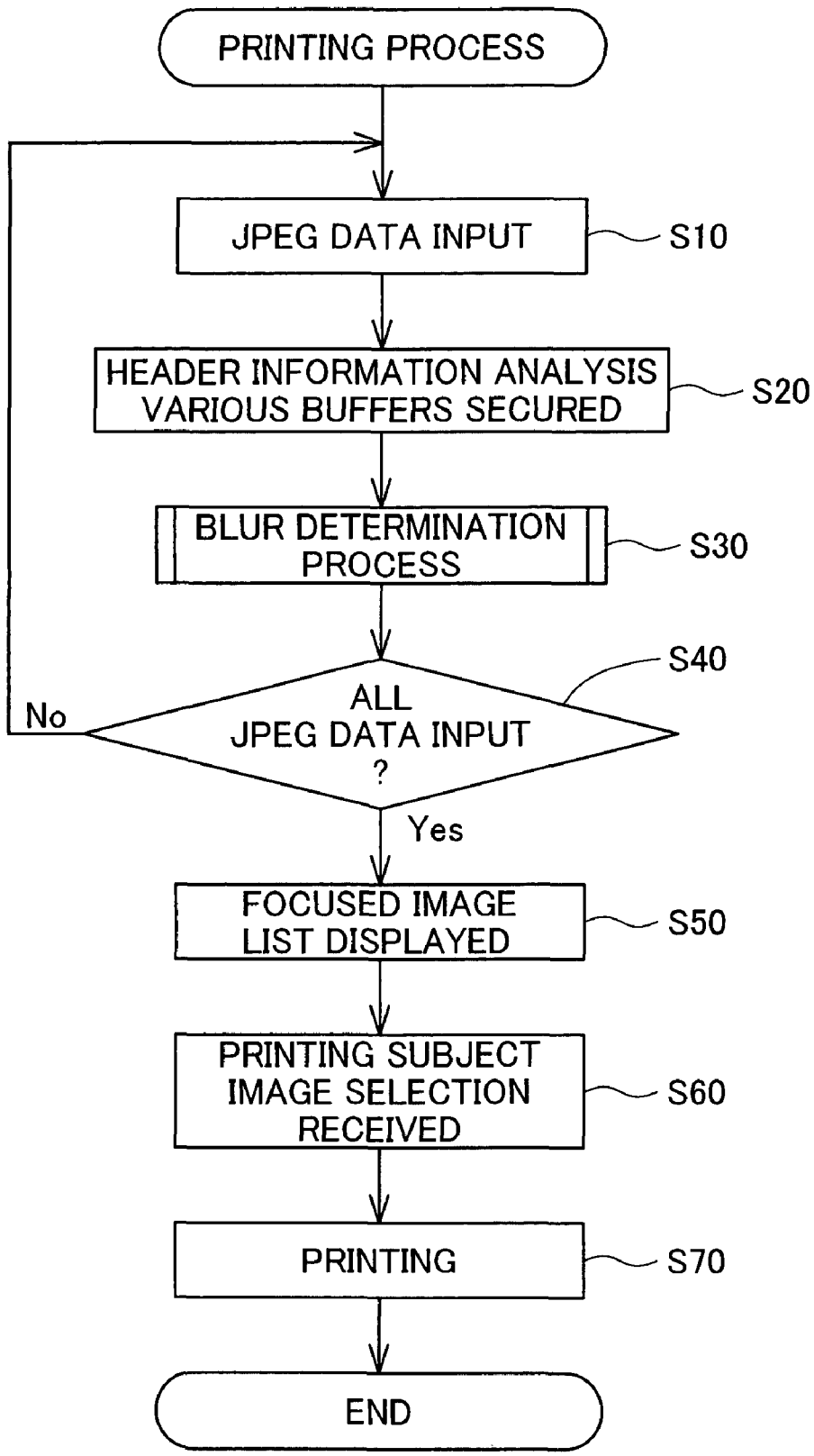
FIG. 8 is a flow chart of the printing process.

C. Printing Process:

FIG. 8 is a flow chart of the printing process executed by the CPU 160 of the printer 100. This printing process is a process for inputting image data from a memory card MC or the like and performing printing.

When this printing process is executed according to a specified operation of the user using the operating panel 140, first, the CPU 160 inputs JPEG data (step S10) from the memory card MC inserted in the memory card slot 120 using the image data input unit 161. Note that here, the JPEG data is input from the memory card MC, but it is also possible to input this from a digital camera, computer, or the like connected via the USB interface 130.

When the JPEG data is input, the CPU 160 analyzes the header information of the input JPEG data, and secures the buffer area necessary for the processing thereafter in the RAM 170 (step S20). In specific terms, the CPU 160 secures a pattern number buffer 171 in which the pattern numbers of the basic edge patterns of two lines of blocks can be recorded in the RAM 170 when blocks are recorded in one line units in the JPEG data as shown in FIG. 3. Also, when blocks are recorded in two line units as shown in FIG. 4, a pattern number buffer 171 for which pattern numbers of 3 lines of blocks can be recorded is secured. Specifically, the CPU 160 secures the pattern number buffer 171 for which pattern numbers of blocks of (n+1) lines can be recorded if blocks are recorded for each of the n (n is an integer of 1 or greater) lines in the JPEG data. Furthermore, the CPU 160, in addition to the pattern number buffer 171, also secures within the RAM 170 the vertical cumulative buffer 173 that records the cumulative value of the vertical direction blur width for one line of blocks, the horizontal cumulative buffer 174 that records the cumulative value of the horizontal direction blur width of one block, and the focused block count buffer 172 that records the number of focused blocks of four lines of sub windows. A suitable explanation of the role and use method of these buffers is given below.

Next, the CPU 160 performs the blur determination process (step S30) while using each type of buffer secured at step S20 for the JPEG data input at step S10. The details of this blur determination process are described later.

When the blur determination process for one JPEG data ends, the CPU 160 inputs all the JPEG data within the memory card MC, and judges whether the blur determination process has ended for these (step S40). With this process, when it is judged that all the JPEG data has not been input (step S40: No), the process returns to step S10, and the next JPEG data is input.

With the aforementioned step S40, when it is judged that the blur determination process has ended for all the JPEG data (step S40: Yes), the CPU 160 displays a list of images determined not to be blurred at step S30, specifically, the focused images, on the liquid crystal display 145 (step S50).

When the list of focused images is displayed on the liquid crystal display 145, the CPU 160 receives the selection of images subject to printing from the user via the operating panel 140 (step S60). Then, the selected images are printed by controlling the ink head 211, the paper feed motor 230, the carriage motor 220 (step S70).

With the printing process described above, all the JPEG data within the memory card MC were input, but it is also possible to input the JPEG data only for a folder specified by the user when a plurality of folders are generated within the memory card MC.

Figure 9:
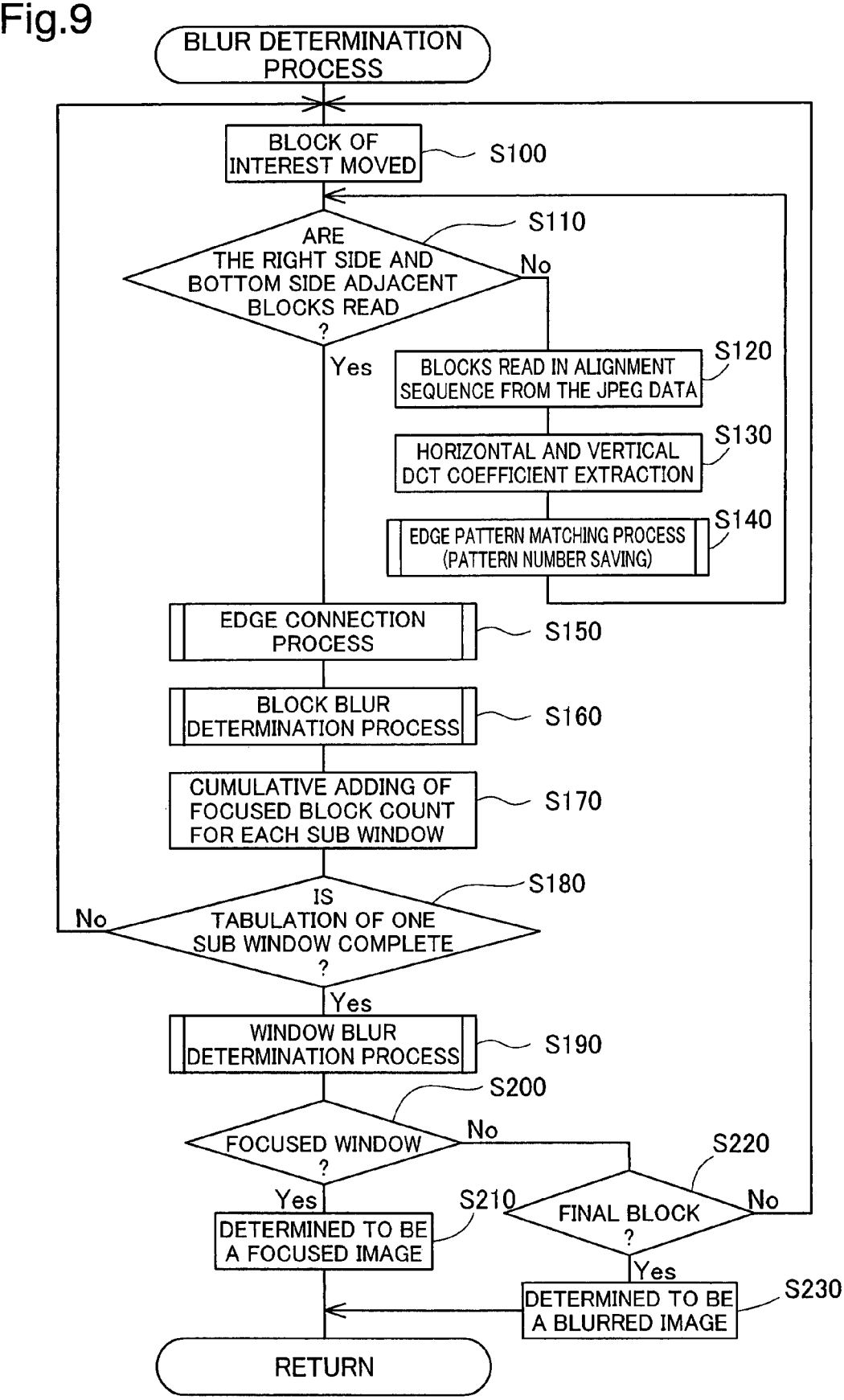
FIG. 9 is a flow chart of the blur determination process.

D. Blur Determination Process:

FIG. 9 is a flow chart of the blur determination process executed at step S30 of the printing process shown in FIG. 8. When this process starts, first, the CPU 160 moves the block for which to do blur determination (hereafter referred to as the "block of interest") along the series of blocks (step S100). The first movement destination is the block existing at the furthest upper left of the JPEG data. The block of interest moves in the rightward direction each time the process of step S100 is executed, and when it reaches the right edge, it moves to the left edge of the next line. The movement sequence of this block of interest is an independent sequence from the block storage sequence shown in FIG. 3 or FIG. 4.

Next, the CPU 160 determines whether the blocks adjacent at the right side and bottom side of the current block of interest has already been read (step S110). As shown in FIG. 6A, this is to obtain the blur width and the brightness difference of the center block (block of interest) based on the data of the adjacent block. If the blocks are read according to the block storage sequence shown in FIG. 3 or FIG. 4, if reading of the right side and bottom side blocks is completed, then reading for the blocks adjacent at the upper side and left side is completed.

If reading of the blocks adjacent at the right side and bottom side of the block of interest is not completed (step S110: No), the CPU 160 reads one block data according to the sequence shown in FIG. 3 or FIG. 4 (step S120). In the header information of the JPEG data is recorded information indicating in which alignment sequence the blocks are stored, so the CPU 160 is able to distinguish the block reading sequence by analyzing this information.

When one block is read, the CPU 160 performs reverse Huffman encoding and reverse quantization on that block data, and then extracts the horizontal direction first coefficient group and the vertical direction second coefficient group from among the 8×8 coefficient groups using the coefficient extraction unit 162 (step S130). In specific terms, the DCT coefficients from "F01" to "F07" shown in FIG. 5A are extracted as the first coefficient group, and the DCT coefficients "F10" to "F70" are extracted as the second coefficient group.

Next, the CPU 160 executes the edge pattern matching process using the pattern matching unit 163 (step S140). According to this process, the basic edge pattern similar to the horizontal direction and vertical direction gradient shapes expressed by the first coefficient group and the second coefficient group extracted by the aforementioned step S130 is selected (a detailed process description is given later). When the basic edge pattern is selected by this process, the pattern number allocated to that basic edge pattern is saved in the pattern number buffer 171 secured in the RAM 170.

Figure 10:
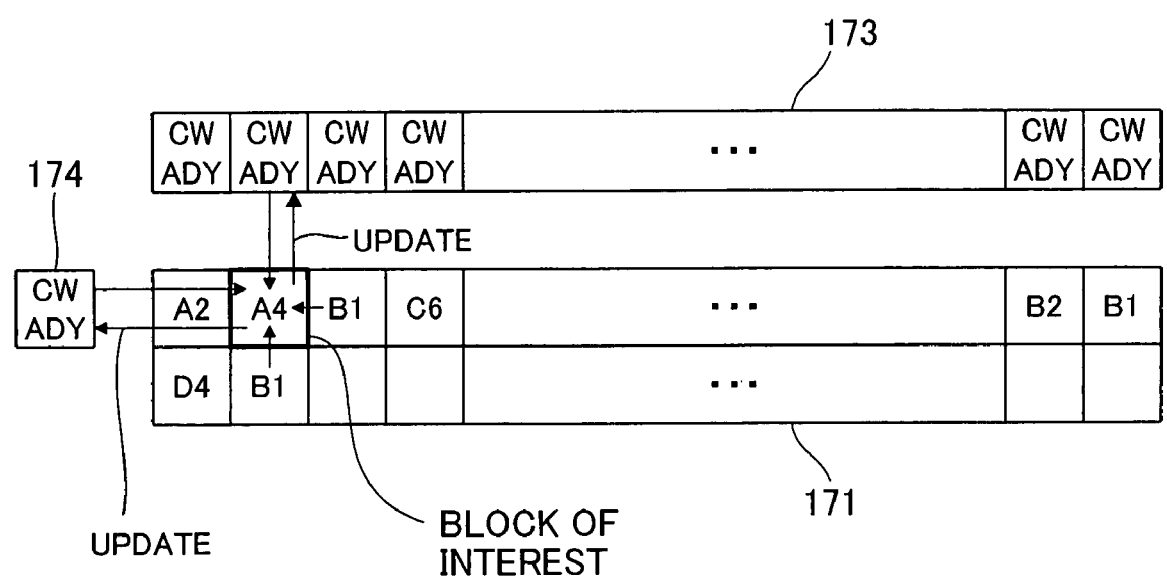
FIG. 10 is an explanatory drawing showing an example of the pattern number buffer secured when blocks are recorded in one line units in the JPEG data.

FIG. 10 is an explanatory drawing showing an example of the pattern number buffer 171 secured when blocks are recorded in one line units in the JPEG data. In this drawing, in addition to the pattern number buffer 171, examples of the vertical cumulative buffer 173 and the horizontal cumulative buffer 174 are shown together. As shown in the drawing, when blocks are stored in one line units in the JPEG data, the pattern number buffer 171 is able to store pattern numbers in an amount of two lines of blocks for the horizontal direction and the vertical direction. In the drawing, the horizontal direction pattern numbers (A2, A4, B1, C6, . . . ) show examples of recording up to the block adjacent at the bottom side of the block of interest. Note that though omitted in the illustration, with the edge pattern matching process executed at step S140, the block internal brightness difference DY is also calculated, so this brightness difference DY is also recorded together with the pattern number in the pattern number buffer 171.

When blocks are stored in one line units in the JPEG data, with the process of the aforementioned step S100, the block of interest moves in the direction from left to right within the pattern number buffer 171 shown in FIG. 10. Specifically, the block of interest moves in sequence from left to right in the first line within the pattern number buffer 171. Then, when the move to the right edge is complete, it again moves to the left edge of the first line. At this time, the pattern number recorded in the second line of the pattern number buffer 171 is moved forward one line and recorded, and for the second line, the pattern numbers are cleared. Then, the pattern numbers fetched by the next edge pattern matching process are recorded in sequence in this second line. In this way, when the block of interest moves to the right edge, if the line of the pattern number buffer 171 is moved forward and the next pattern number is recorded, the block of interest moves relatively to the bottom side of the image.

When blocks are stored in one line units for the JPEG data, as can be seen clearly from FIG. 10, to judge whether or not the block adjacent at the right side and bottom side of the block of interest is already read, it is sufficient to have a minimum of two lines of blocks of pattern numbers recorded. Therefore, with this embodiment, when blocks are stored in one line units for the JPEG data, a pattern number buffer 171 is prepared for which pattern numbers of two lines of blocks can be recorded. By working in this way, it is no longer necessary to store the pattern numbers for all the blocks included in the JPEG data, and it is possible to reduce the necessary memory capacity.

Figure 11A:
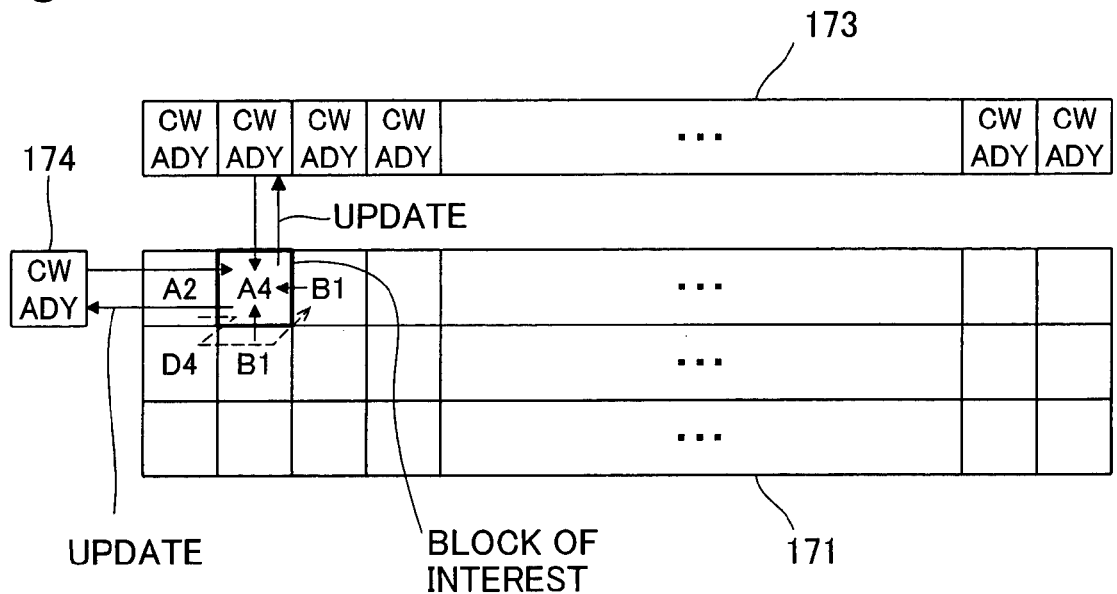
FIGS. 11A and 11B are explanatory drawings showing an example of the pattern number buffer secured when blocks are recorded in two line units in the JPEG data.
Figure 11B:
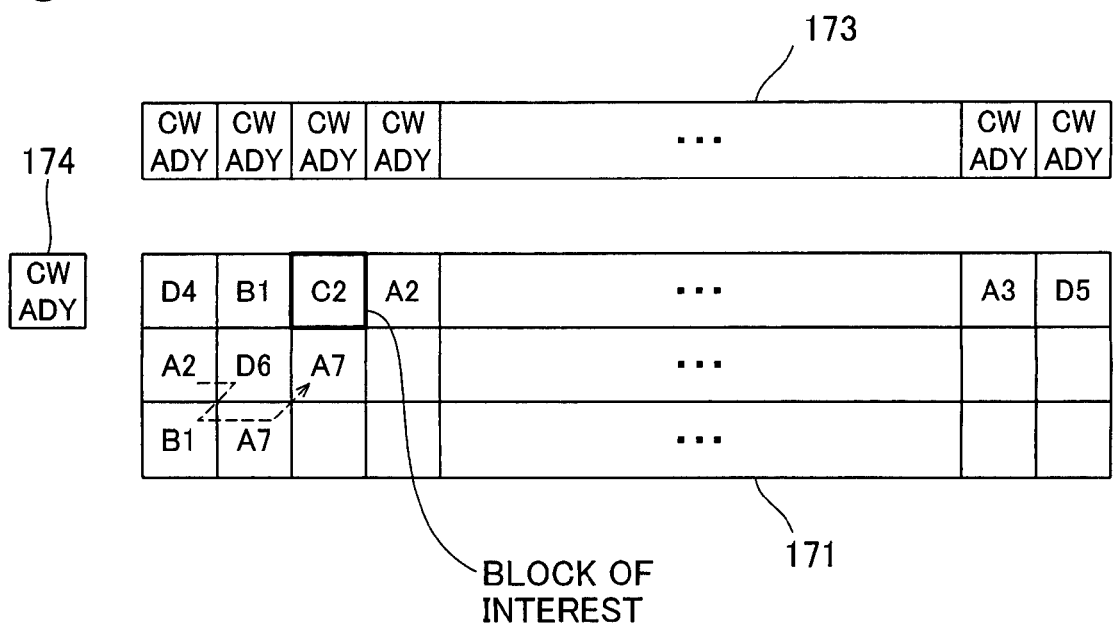

FIGS. 11A and 11B are explanatory drawings showing an example of the pattern number buffer 171 secured when blocks are recorded in two line units for the JPEG data. As shown in the drawing, in this case, a storage area is prepared for pattern numbers of three lines of blocks in the pattern number buffer 171.

When blocks are stored in two line units for JPEG data, when the block of interest is positioned in the first line in the image, at the aforementioned step S100, as shown in FIG. 11A, the block of interest moves to the right direction of the first line within the pattern number buffer 171. Then, when the move to the right edge is completed, it again moves to the left edge of the first line. At this time, the pattern number recorded in the second line of the pattern number buffer is moved forward one line and recorded, and for the second line, the pattern numbers are cleared. Then, as shown in FIG. 11B, using the second line and the third line, the pattern numbers fetched by the process of the edge pattern matching process are recorded for each two lines according to the alignment sequence shown in FIG. 4.

When blocks are stored in two line units for the JPEG data, to judge whether or not the block adjacent at the right side and bottom side of the block of interest has already been read, as is clearly seen in FIG. 11B, a minimum of three lines of blocks of pattern numbers are required. In FIG. 11B, shown is an example of the right side and down side block being recorded for the block of interest (in the drawing, pattern number C2) of the first line within the pattern number buffer 171, but this is because if it is according to the storage sequence shown in FIG. 4, when the second line start block of the current line cannot be read, the block at the bottom side of the block of interest (pattern number in the drawing: A7) cannot be read. Therefore, with this embodiment, when blocks are stored in two line units for the JPEG data, a pattern number buffer 171 is prepared for which pattern numbers of three lines of blocks can be stored.

Note that FIG. 10, FIG. 11A and FIG. 11B show the vertical cumulative buffer 173 for saving one line of blocks of vertical direction cumulative blur width CW and cumulative brightness difference ADY, and horizontal cumulative buffer 174 for saving one block of horizontal direction cumulative blur width CW and cumulative brightness difference ADY, and the method of using these buffers is described later.

Here, the explanation returns to FIG. 9. By the edge pattern matching process of the aforementioned step S140, when the pattern number of the block read at step S120 is saved on the pattern number buffer 171, the CPU 160 again judges whether or not the block adjacent at the right side and bottom side of the current block of interest has been read by executing the process of the aforementioned step S110. With this process as well, if it is judged that these blocks have not been read, the process from the aforementioned step S120 to step S140 are repeated until the blocks adjacent at the right side and bottom side are read, and the pattern numbers are saved in the pattern number buffer 171.

At the aforementioned step S110, if it is judged that the block adjacent at the right side and bottom side of the block of interest has been read (step S110: Yes), the CPU 160 references the pattern number buffer 171, the vertical cumulative buffer 173, and the horizontal cumulative buffer 174, and the edge connection process is executed by the edge connection unit 164 (step S150). The details of this edge connection process are described later, but with this edge connection process, the blur widths of the adjacent blocks are cumulatively added to each other, and the blur width of the block of interest is calculated.

When the blur width of the block of interest is calculated by the edge connection process, next, the CPU 160 executes the block blur determination process using the block blur determination unit 165 (step S160). In this process, it is determined that whether or not the block of interest is blurred based on the blur width calculated by the edge connection process. Details of this process will also be described later, but as the execution results of this process, fetched are the determination results of whether the block of interest is a "blurred block" or a "focused block."

By the block blur determination process, when it is determined whether the block of interest is a "blurred block" or a "focused block," the CPU 160 finds which sub window (see FIG. 7) the current block of interest is positioned inside, and cumulatively adds the focused block count for each sub window (step S170). With FIG. 7, shown is an example of there being 7×7 for a total of 49 blocks within one sub window, so in this case, the maximum cumulative added value according to this process is "49." The cumulative added value of the focused blocks is recorded in the focused block count buffer 172 secured in the RAM 170.

Figure 12:
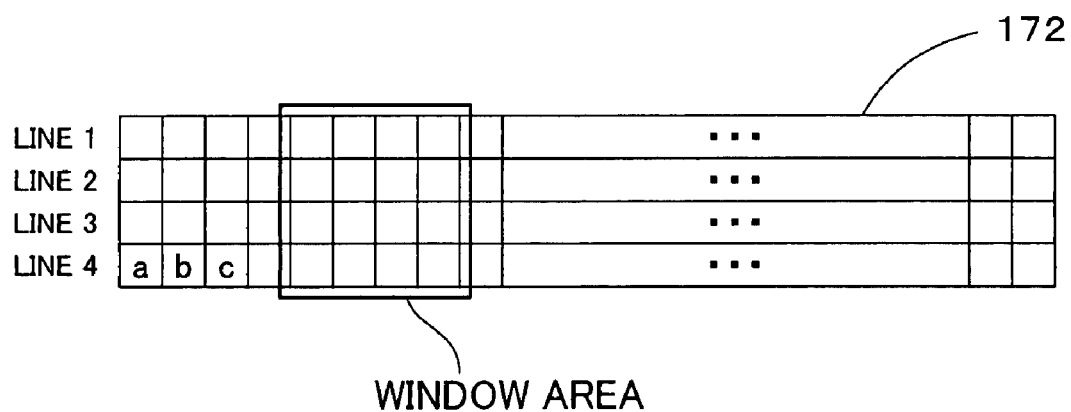
FIG. 12 is an explanatory drawing showing an example of the focused block count buffer.

FIG. 12 is an explanatory drawing showing an example of the focused block count buffer 172. With this embodiment, to judge whether there is ultimately blur for the window area of 4×4 sub windows, as shown in the drawing, a storage area of four lines of sub windows is prepared in the focused block count buffer 172. With the aforementioned step S170, the number of focused blocks is cumulatively added in the storage area corresponding to the sub window to which the current block of interest belongs. This cumulative value is recorded in the sequence from the fourth line of the focused block count buffer 172 of "a" "b" "c" . . . shown in the drawing. When the sub window to which the current block of interest belongs moves to the right edge of the focused block count buffer 172, the value of the fourth line of that focused block count buffer 172 moves forward to the third line, and similarly the other lines also move forward one line each. Then, the buffer area of the fourth line is cleared, and the next focused block count is recorded in that area.

The description returns to FIG. 9. After cumulatively adding the focused block count for each sub window using step S170, the CPU 160 judges whether the tabulation of the focused block count is completed for any one of the sub windows (step S180). Then, if it is judged that the tabulation for one sub window is not completed (step S180: No), the CPU 160 returns the process to step S100, moves the block of interest, and then continues by judging whether the next block is a "blurred block" or a "focused block." Meanwhile, if it is judged that the tabulation of one sub window is completed, the CPU 160 performs the window blur determination process (step 190) using the window blur determination unit 166 for the entire window area to which that sub window belongs. With this window blur determination process, at the focused block count buffer 172 shown in FIG. 12, the window area moves sequentially in the horizontal direction, and based on the total focused block count within that window area, a determination is made of whether that window area is blurry. Details of this process are described later.

When the window blur determination process at the aforementioned step S190 ends, the CPU 160 determines whether the current window area is a focused window (step S200) based on the determination results of this determination process. As a result of this determination, if that window is a focused window (step S200: Yes), the image expressed by the currently input JPEG data is determined to be focused (step S210), and the series of blur determination processes described above is ended. Specifically, at the point that any of the areas within the image is determined to be a focused window, then the JPEG data input at step S10 of FIG. 8 is determined to be a focused image. By working in this way, if any of the window areas in the image is a focused window, it is not necessary to determine the presence or absence of blur for all the areas in the image, so it is possible to shorten the processing time.

In contrast to this, when the window area for which the window blur determination process was performed at the aforementioned step S200 is determined to be a blurred window (step S200: No), the CPU 160 subsequently judges whether the current block of interest is the final block at the lower right corner of the image (step S220). As a result, if the current block of interest is judged to be the final block (step S220: Yes), it is possible to judge that this window area also was not a focused window, so the image expressed by the currently input JPEG data is determined to be a blurred image (step S230), and the series of blur determination processes described above end. Meanwhile, if the current block of interest is not the final block (step S220: No), the CPU 160 returns the process to the aforementioned step S100, and for the block of the next position, repeatedly executes the various processes described above.

Figure 13:
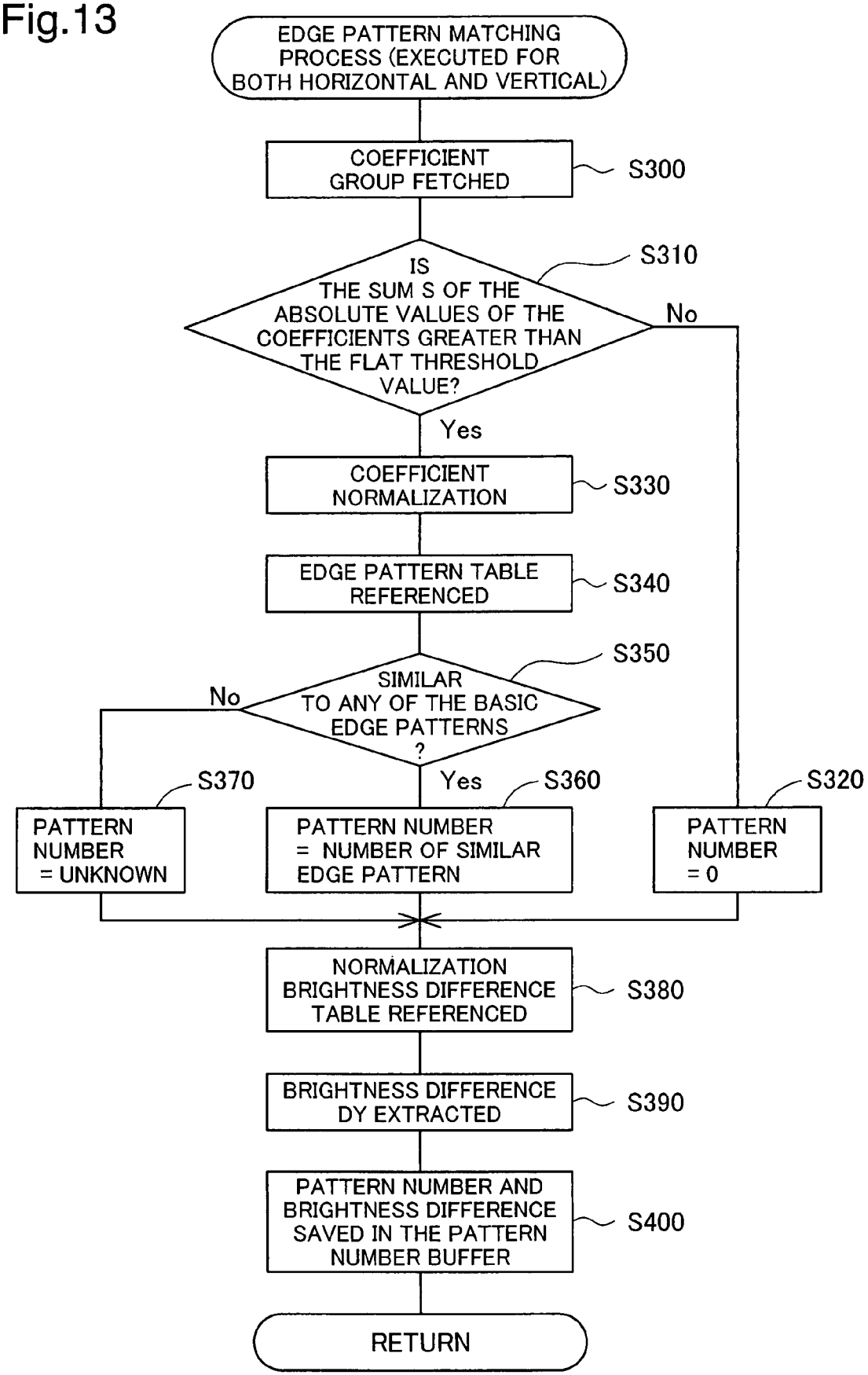
FIG. 13 is a detailed flow chart of the edge pattern matching process.

E. Edge Pattern Matching Process:

FIG. 13 is a detailed flow chart of the edge pattern matching process executed at step S140 of the blur determination process shown in FIG. 9. This process is for selecting from the edge pattern table 181 the basic edge patterns similar to the horizontal direction and vertical direction gradient shapes of each block, and for calculating the brightness difference with the block.

When this process is executed, first, the CPU 160 fetches (step S300) the first coefficient group and second coefficient group (see FIG. 5A) extracted at step S130 of the blur determination process. With this edge pattern matching process, the process is executed in the same way respectively for the first coefficient group and the second coefficient group, so hereafter, as a representative of these, the process on the first coefficient group that expresses the horizontal direction DCT coefficients is described.

When the CPU 160 fetches the first coefficient group with the aforementioned step S300, the sum of the absolute values of each coefficient F01 to F07 constituting this first coefficient group is obtained, and a determination is made of whether this exceeds a specified flat threshold value (e.g. 80) (step S310). The sum S of the absolute values of the first coefficient group can be obtained using the formula (1) below.

$$S = \Sigma |F0i| (i=1 \text{ to } 7) \quad (1)$$

At the aforementioned step S310, if it is judged that the sum S of the absolute value of the first coefficient group is the specified flat value or less (step S310: No), the horizontal direction brightness change of that block can be regarded as being flat. Therefore, the pattern number of this block edge pattern is set as "0" expressing that this is a flat edge pattern (step S320).

At the aforementioned step S310, if it is judged that the sum S of the absolute values of the first coefficient group exceeds a specified flat threshold value (step S310: Yes), it is possible to judge that there is some brightness difference in the horizontal direction of that block. In light of this, first, the CPU 160 performs normalization based on the following formula (2) for each coefficient value F01 to F07 of the first coefficient group (step S330). With formula (2) noted below, each coefficient value Fr01 to Fr07 after normalization becomes a value for which the respective coefficient values F01 to F07 are divided by the sum S of the absolute values of the first coefficient group.

$$Fr0j = F0j/S (j=1 \text{ to } 7) \quad (2)$$

Next, the CPU 160 references the edge pattern table 181 stored in the ROM 180 (step S340), and judges whether any of the gradient shapes expressed by each of the coefficient values Fr01 to Fr07 after normalization is similar to the basic edge pattern (step S350).

Figure 14:
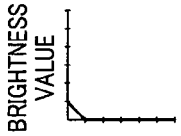
FIG. 14 is an explanatory drawing showing an example of the edge pattern table.
Figure 14:
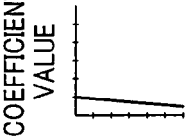
Figure 14:
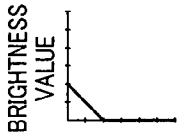
Figure 14:
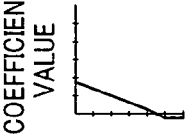
Figure 14:
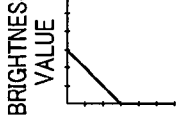
Figure 14:
Figure 14:
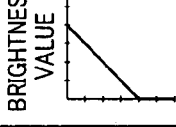
Figure 14:
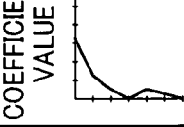
Figure 14:
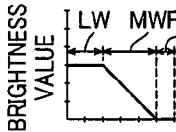
Figure 14:
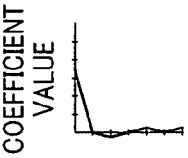
Figure 14:
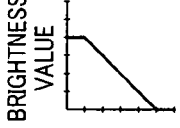
Figure 14:
Figure 14:
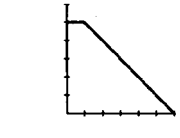
Figure 14:

FIG. 14 is an explanatory drawing showing an example of the edge pattern table 181. 16 types of basic edge pattern (third column in the drawing) are correlated to the pattern numbers (first column in the drawing) from "A1" to "A16" and recorded in this edge pattern table 181. The horizontal axis of the basic edge pattern expresses the position of the coefficients in the block (F01 to F07), and the vertical axis expresses the coefficient value Fr after normalization. Specifically, the basic edge pattern is data consisting of seven coefficient values.

Each basic edge pattern is generated based on the brightness pattern shown in the second column of the drawing. Specifically, the brightness pattern shown in the second column of the drawing that has undergone DCT transformation and normalization becomes the basic edge pattern shown in the third column of the drawing. Note that the brightness pattern in the drawing is actually not recorded in the edge pattern table 181 but is noted for further understanding. Each brightness pattern has the typical shape of the brightness change for which the slant code within one block does not change classified into 16 types in advance. With this embodiment, in this way, the basic edge patterns are classified into 16 types, but it is also possible to classify into a higher number of patterns.

Further recorded in the edge pattern table 181 are three types of parameters correlated to the basic edge pattern, including the left side edge width LW, the middle edge width MW, and the right side edge width RW. The left side edge width LW expresses the width of the flat part that exists at the left side of the brightness pattern, and the right side edge width RW expresses the width of the flat part that exists at the right side of the brightness pattern. Also, the middle edge width MW expresses the width of the gradient part sandwiched by the left side edge width LW and the right side edge width RW.

Note that though not illustrated, in this edge pattern table 181, in addition to the basic edge patterns from "A1" to "A16," the edge patterns for which these basic edge patterns are inverted left to right are defined as pattern numbers B1 to B16, and the edge patterns inverted top to bottom are defined as pattern numbers C1 to C16. Also, the basic edge patterns for which the basic edge patterns from "A1" to "A16" are inverted top to bottom and left to right are defined as pattern numbers D1 to D16. Specifically, overall, a total of 64 types of basic edge patterns are defined in this edge pattern table 181.

With step S350 in FIG. 13, the sum of the absolute values of the difference SD of each coefficient value Fr01 to Fr07 for which normalization was performed at step S330 and of each coefficient value Fb01 to Fb07 constituting the basic edge patterns are calculated according to the following formula (3), and the basic edge pattern for which this total value SD is the smallest is selected from within the edge pattern table 181. Then, if the total value SD for the selected basic edge pattern is smaller than a specified threshold value, it is judged that a basic edge pattern similar to the shape has been found (step S350: Yes), and the pattern number correlated to that basic edge pattern is fetched (step S360). Meanwhile, when the value SD obtained by the calculation described above is larger than the specified threshold value, a similar basic edge pattern is regarded as not having been found, and the pattern number is "Unknown" (step S370).

$$SD = \Sigma |Fr0k - Fb0k| (k=1 \text{ to } 7) \quad (3)$$

Using the process above, when the current block pattern number is set, next, the CPU 160 references the normalization brightness difference table 182 recorded in the ROM 180 (step S380), and the brightness difference DY in the current block is calculated (step S390).

FIG. 15 is an explanatory drawing showing an example of the normalization brightness difference table 182. In this normalization brightness difference table 182, the normalization brightness difference values NY are correlated to each pattern number and recorded. This normalization brightness difference value NY is the brightness difference calculated in advance according to the brightness pattern shape expressed by the basic edge pattern. With the step S390 noted above, the normalization brightness difference value NY correlated to the pattern number fetched at the aforementioned step S360 is fetched from this normalization brightness difference table 182. Then, according to the following formula (4), the brightness difference DY in the block is found by multiplying the sum S of the absolute values of each coefficient calculated with the aforementioned formula (1) by the fetched normalization brightness value NY. In this way, if the normalization brightness difference value NY calculated in advance is used, it is possible to calculate the brightness difference in the block simply and quickly without finding the brightness value by doing a reverse DCT transform of the coefficient values within the block.

$$DY = S \cdot NY \quad (4)$$

With the process above, when the current block pattern number and brightness difference DY are set, the CPU 160 saves (step S400) these parameters in the pattern number buffer 171 (see FIG. 10, FIG. 11A or FIG. 11B) corresponding to the current block. By doing this, the series of edge pattern matching processes described above end, and the process returns to the blur determination process step S110.

Figure 16:
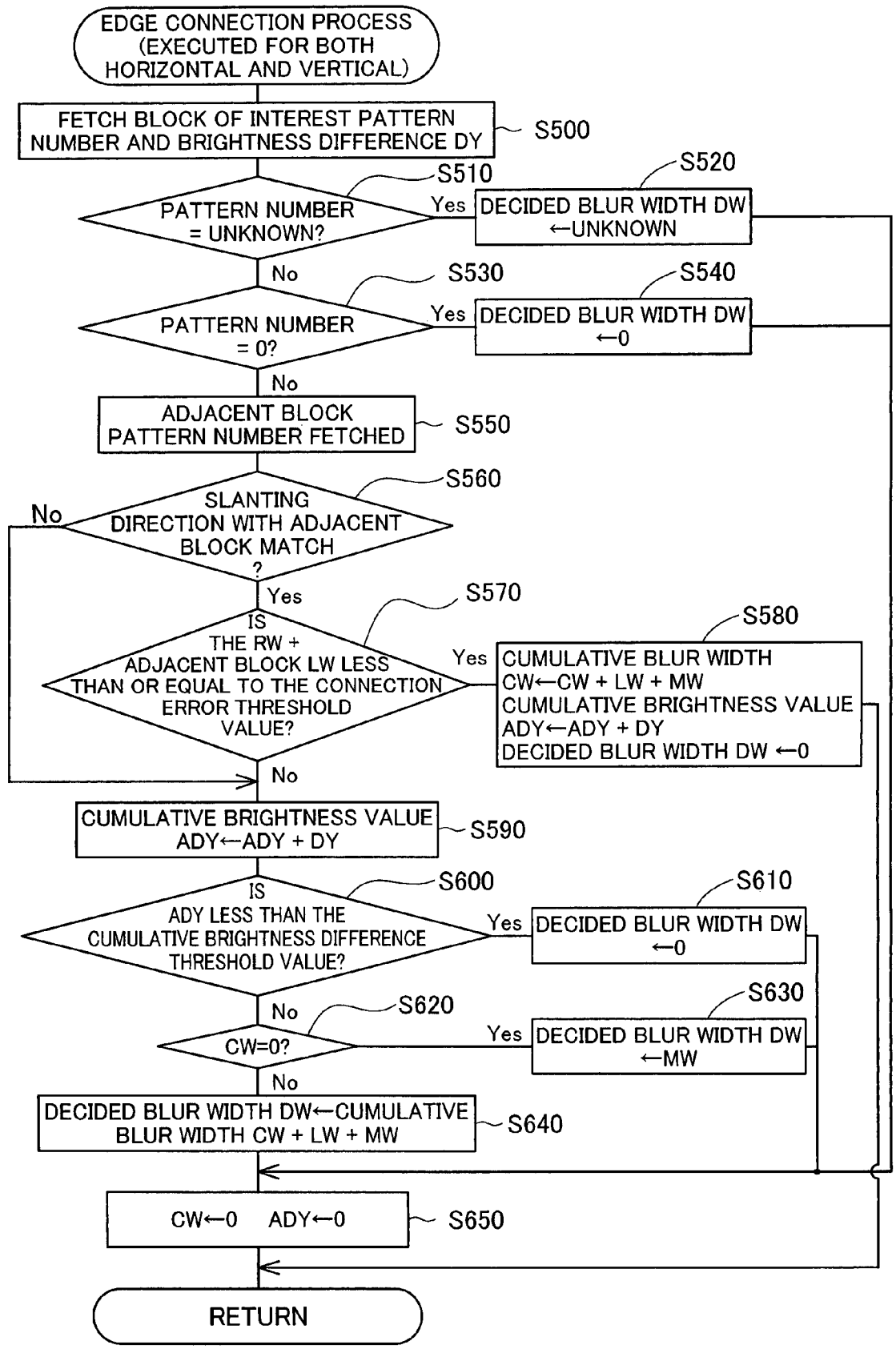
FIG. 16 is a detailed flow chart of the edge connection process.

F. Edge Connection Process:

FIG. 16 is a detailed flow chart of the edge connection process executed at step S150 of the blur determination process shown in FIG. 9. As shown in FIG. 6A, this process is a process setting the blur width and brightness difference of the middle block (block of interest). This process is performed for the horizontal direction and the vertical direction, but to make the description simple, unless noted otherwise, the process performed for the horizontal direction is described.

When this process is executed, first, the CPU 160 fetches (step S500) the pattern number and the brightness difference DY of the current block of interest from the pattern number buffer 171 (see FIG. 10, FIG. 11A or FIG. 11B). These parameters are recorded in the pattern number buffer 171 by the aforementioned edge pattern matching process.

Next, the CPU 160 judges that the pattern number fetched at step S500 is "Unknown" (step S510). As a result, if the pattern number is "Unknown" (step S510: Yes), with the edge pattern matching process described above, the brightness change of the current block of interest is determined not to be similar to any of the basic edge patterns (see steps S350 and S370 of FIG. 13), the blur width of the block of interest is decided as "Unknown" (step S520). The blur width decided in this way is hereafter called the "decided blur width DW."

At the aforementioned step S510, if the pattern number is judged not to be "Unknown" (step S510: No), next, the CPU 160 judges whether the pattern number is "0" (step S530). As a result of this judgment, if the pattern number is "0" (step S530: Yes), with the edge pattern matching process described above, the horizontal direction brightness change is determined to be flat (see steps S310, S320 of FIG. 13), so the block of interest decided blur width DW is set as "0" (step S550).

With the aforementioned step S530, when it is judged that the pattern number is not "0" (step S530: No), the CPU 160 fetches (step S510) the pattern number of the block adjacent (hereafter called the "adjacent block") at the right side of the block of interest (bottom side when the vertical direction edge connection process) from the pattern number buffer 171 (see FIG. 10, FIG. 11A or FIG. 11B). Then, the pattern number of the block of interest and the pattern number of the adjacent block are compared, and a judgment is made of whether or not the slanting directions of the basic edge patterns of these blocks match (step S560).

Figure 17:
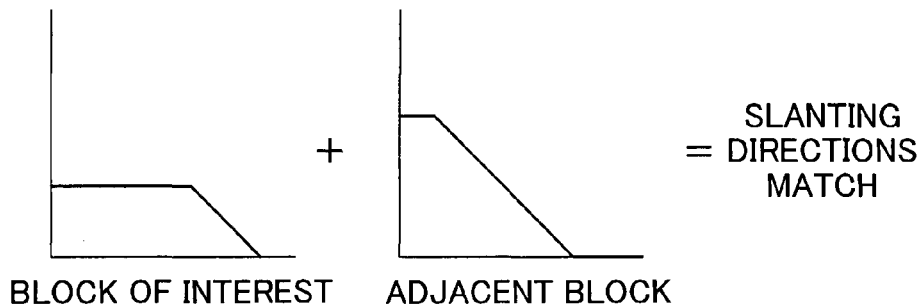
FIG. 17 is an explanatory drawing showing an example for which the basic edge pattern slanting directions of the block of interest and the adjacent block match.

FIG. 17 is an explanatory drawing showing an example of the slanting directions of the basic edge pattern of the block of interest and the adjacent block matching. With the example shown in the drawing, the slant of both blocks are both right downward, therefore the slant direction of both items match. As a combination for which the slanting direction of the block of interest and the adjacent block match, there is the following kind of pattern number combination. Specifically, the CPU 160 is able to judge that these slanting directions match if the combination of the pattern number of the block of interest and the pattern number of the adjacent block is contained in any of the combinations of (1) to (8) shown below.

|  | Block of Interest No. | Adjacent Block No. |
| --- | --- | --- |
| (1) | A1 to A16 | A1 to A16 |
| (2) | A1 to A16 | D1 to D16 |
| (3) | B1 to B16 | B1 to B16 |
| (4) | B1 to B16 | C1 to C16 |
| (5) | C1 to C16 | C1 to C16 |
| (6) | C1 to C16 | B1 to B16 |
| (7) | D1 to D16 | D1 to D16 |
| (8) | D1 to D16 | A1 to A16 |

Figure 18:
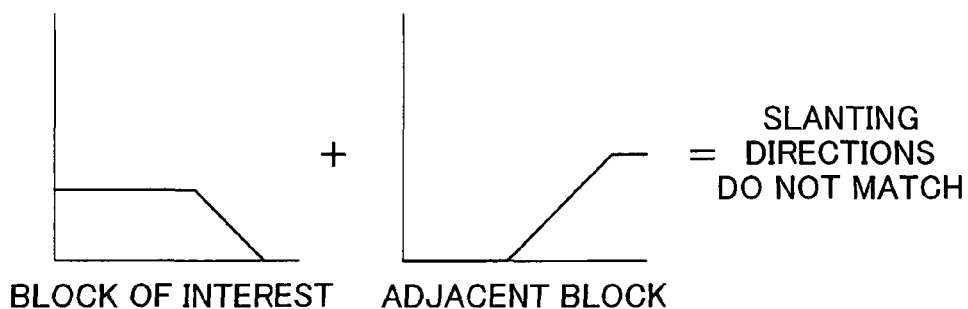
FIG. 18 is an explanatory drawing showing an example for which the basic edge pattern slanting directions of the block of interest and the adjacent block do not match.

FIG. 18 is an explanatory drawing showing an example when the slanting directions of the basic edge patterns of the block of interest and the adjacent block to not match. With the example shown in the drawing, in contrast to the slant of the block of interest being right downward, the slant of the adjacent block is right upward, therefore the slant of both items does not match. The combinations of pattern numbers for which the slanting direction of both blocks do not match are combinations other than (1) to (8) noted above.

With the aforementioned step S560, when it is judged that the slanting directions match (step S560: Yes), the CPU 160 subsequently determines whether the block of interest right side edge width RW and the adjacent block left side edge width LW addition value is within a specified connection error threshold value (step S570). Note that ahead of this determination, the CPU 160 references the edge pattern table 181 and fetches the left side edge width LW from the adjacent block pattern number.

Figure 19:
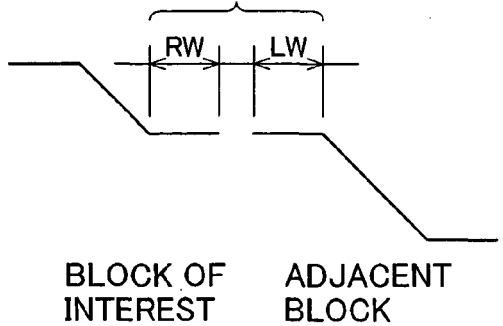
FIG. 19 is an explanatory drawing showing the state of comparison of the added value of the block of interest right side edge width and the adjacent block left side edge width with the connection error threshold value.

FIG. 19 is an explanatory drawing showing the status of a comparison of the block of interest right side edge width RW and the adjacent block left side edge width LW addition value and the connection error threshold value. As shown in the drawing, when the sum of the flat part (right side edge width RW) existing at the right side of the basic edge pattern of the block of interest and the flat part (left side edge width LW) existing at the left side of the basic edge pattern of the adjacent block is large and exceeds the connection error threshold value, the gradient is not continuous with the block of interest and the adjacent block, and it is possible to judge that separate blurred parts are formed. Because of that, at the aforementioned step S570, the determination is "No." In contrast to this, when the sum described above is small and is the connection error threshold value or lower, the gradient is probably continuous between the edge pattern of the block of interest and the edge pattern of the adjacent block, so with the aforementioned step S570, the determination is "Yes."

With the aforementioned step S570, if the addition value of the block of interest right side edge width RW and the adjacent block left side edge with LW is determined to be within a specified connection error threshold value (step S570: Yes), the CPU 160 reads the cumulative blur width CW and the cumulative brightness difference ADY accumulated in the block of the left side so far (with the vertical direction edge connection processing, the upper side) from the horizontal cumulative buffer 174 (with vertical direction edge connection processing, the vertical cumulative buffer 173) (see FIG. 10, FIG. 11A or FIG. 11B). Then, together with adding the block of interest left side edge width LW and middle edge width MW to this cumulative blur width CW, the process is performed of adding the block of interest brightness DY to the cumulative brightness difference ADY (step S580). When a new cumulative blur width CW and cumulative brightness difference ADY are found in this way, the CPU 160 overwrites the new value on the horizontal cumulative buffer 174 (with the vertical direction edge connection process, the vertical cumulative buffer 173) and updates (see FIG. 10, FIG. 11A or FIG. 11B). By working in this way, when the edge pattern slant is continuous in one direction for the adjacent blocks with each other, it is possible for the blur width and brightness difference of each block to be sequentially accumulated. Note that with the aforementioned step S580, the CPU 160 sets the block of interest decided blur width DW to "0" for convenience. Specifically, when the blur width is accumulated, for the blocks midway in that accumulation, these are regarded uniformly as flat blocks.

Figure 20:
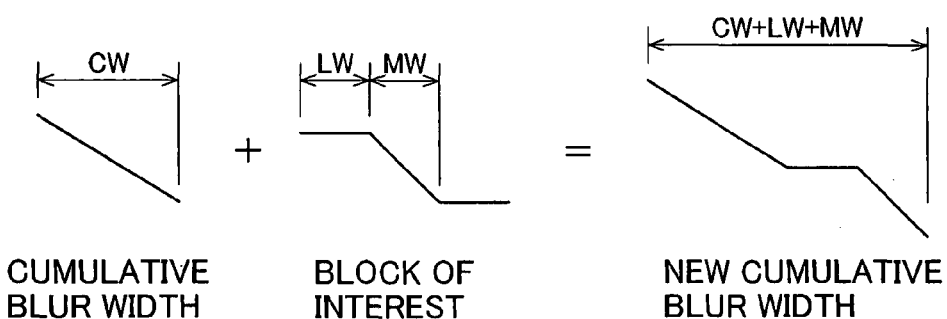
FIG. 20 is an explanatory drawing showing the concept of calculating the cumulative blur width.

FIG. 20 is an explanatory drawing showing the cumulative blur width CW calculation concept at the aforementioned step S580. As shown in the drawing, with the aforementioned step S580, the value for which the block of interest left side edge width LW and middle edge width MW are added to the cumulative blur width CW up to now is the new cumulative blur width CW. Note that ahead of this operation, the CPU 160 references the edge pattern table 181, and fetches the left side edge width LW and the middle edge width MW corresponding to the pattern number of the block of interest.

With the aforementioned step S560, when it is judged that the block of interest slanting direction and the adjacent block slanting direction do not match (step S560: No), if at the aforementioned step S570, it is judged that the sum of the block of interest right side edge width RW and the adjacent block left side edge width LW exceeds the connection error threshold value (step S570: No), the CPU 160 subsequently performs the process of judging whether or not the block of interest is flat using the cumulative brightness difference ADY. Specifically, first, the cumulative brightness difference ADY is read from the horizontal cumulative buffer 174 (with vertical direction edge connection processing, the vertical cumulative buffer 173), and the sum of this cumulative brightness difference ADY and block of interest brightness difference DY is found (step S590). Then, a judgment is made of whether this sum is less than a specified cumulative brightness difference threshold value (e.g. "32") (step S600). With this judgment, if the cumulative brightness difference ADY is judged to be less than the specified cumulative brightness difference threshold value (step S600: Yes), regardless of the accumulation of brightness difference DY up to now, that cumulative value is insufficient, and the brightness change of the block of interest is judged to be flat, and that decided blur width DW is set as "0" (step S610). With this process, it is possible to do not just judgment based on the edge pattern, but also judgment of whether or not the block is flat according to the brightness difference, so it is possible to judge the presence or absence of blur within an image with greater precision.

With the aforementioned step S600, if the cumulative brightness difference ADY is judged to exceed the cumulative brightness difference threshold value (step S600: No), then it is possible to judge that the block of interest is not a flat edge pattern. In light of this, the CPU 160 subsequently judges whether the cumulative blur width CW read from the horizontal buffer 174 (with the vertical direction edge connection process, the vertical cumulative buffer 173) is "0" (step S620). If it is judged by this judgment that the cumulative blur width CW is "0" (step S620: Yes), then the block of interest is the start point at which blur occurs, and furthermore, according to the determination results at the aforementioned steps S560 and S570, because the edge pattern is also not continuous with the right side (with the vertical direction edge connection process, the bottom side) adjacent block, the block of interest is judged to have an independent edge pattern. Therefore, the CPU 160 sets the block of interest middle edge width MW as the decided blur width DW (step S630). Note that the CPU 160 references the edge pattern table 181 ahead of this process, and fetches the middle edge width MW corresponding to the block of interest pattern number.

With the aforementioned step S620, if the cumulative blur width CW is judged to not be "0," the block of interest is not continuous with the right side (with the vertical direction edge connection process, the bottom side) adjacent block, but it is continuous with the left side (with the vertical direction edge connection process, the upper side) adjacent block. Specifically, the block of interest is equivalent to the end of the blurred part. Because of that, the CPU 160 adds the block of interest left side edge width LW and middle edge width MW to the cumulative blur width CW read from the horizontal cumulative buffer 174 (with the vertical direction edge connection process, the vertical cumulative buffer 173), and sets this value as the decided blur with DW (step S640). Note that the CPU 160 references the edge pattern table 181 ahead of this process, and fetches the left side edge width LW and middle edge width MW corresponding to the block of interest pattern number.

When the decided blur width DW is set by the aforementioned step S640, since the blur width is terminated, subsequently the CPU 160, with the cumulative blur width CW and cumulative brightness difference ADY as "0" (reset), records these values in the horizontal cumulative buffer 174 (with the vertical direction edge connection process, the vertical cumulative buffer 173) (step S650). By doing this, the blur width accumulation starts from the position of the next block of interest. Also for cases when the decided blur width DW is set by the aforementioned steps S520, S540, S610, and S630, with the aforementioned step S650, the cumulative blur width CW and the cumulative brightness difference ADY are "0." This is because in these cases, the block of interest is flat or forms an independent edge, so it is not necessary to accumulate blur width or the brightness difference.

In contrast to this, with the aforementioned step S570, when it is judged that the block of interest and the adjacent block are continuous, without resetting the cumulative blur width CW and the cumulative brightness difference ADY, CPU 160 records the cumulative value calculated at step S580 in the horizontal cumulative buffer 174 (with the vertical direction edge connection process, the vertical cumulative buffer 173). By working in this way, it is possible to accumulate the blur width and brightness difference for the next block of interest.

With the above, the series of edge connection processes ends. With this edge connection process, the decided blur width DW of the horizontal and vertical direction used with the block blur determination process described later is set, and the cumulative blur width CW and cumulative brightness difference ADY used with the next edge connection process are recorded in the horizontal cumulative buffer 174 and the vertical cumulative buffer 173. When this edge connection process ends, the CPU 160 returns the process to the blur determination process shown in FIG. 9, and then continues to execute the block blur determination process (step S160).

Figure 21:
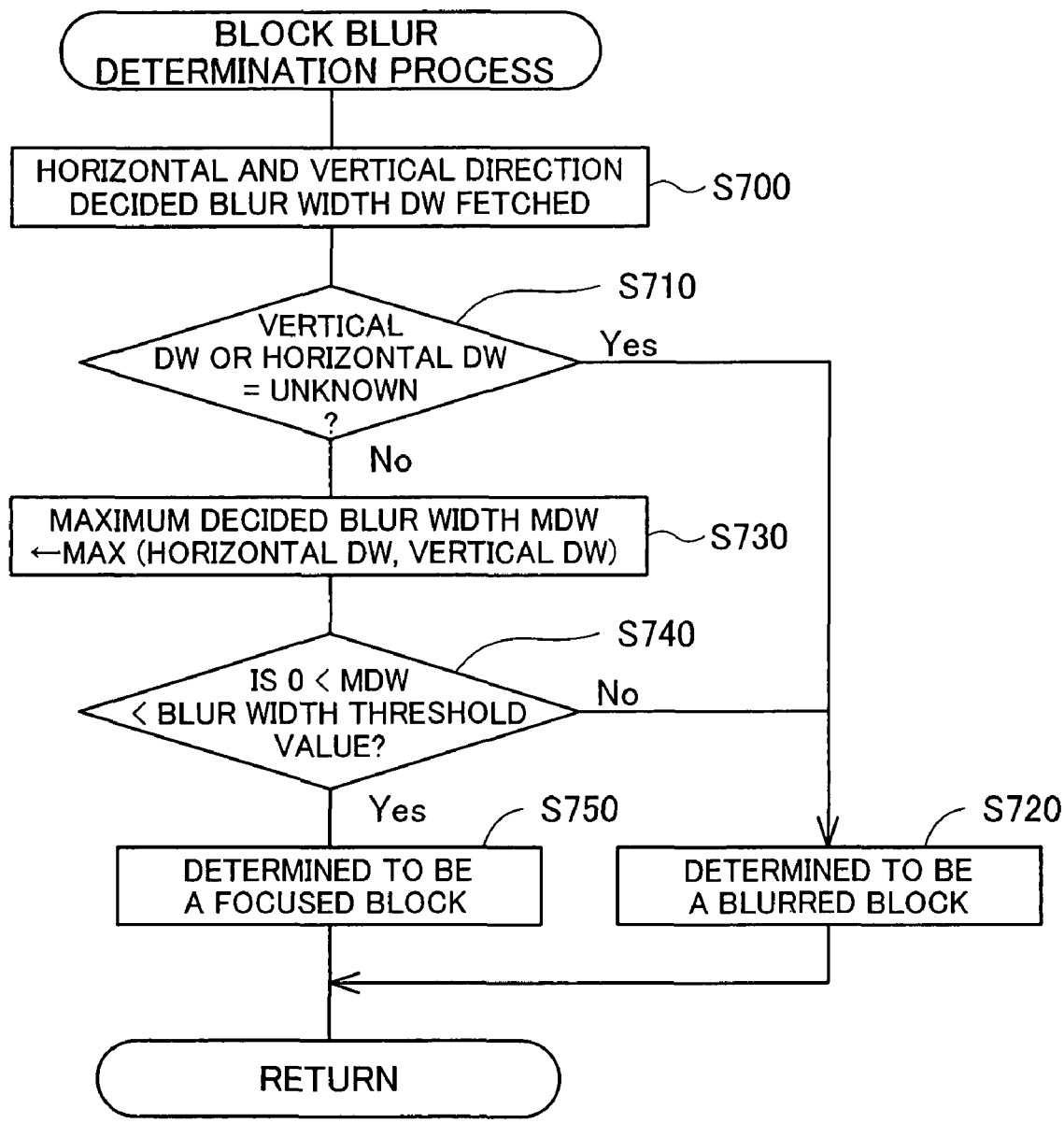
FIG. 21 is a detailed flow chart of the block blur determination process.

G. Block Blur Determination Process:

FIG. 21 is a detailed flow chart of the block blur determination process executed at step S160 of the blur determination process shown in FIG. 9. This process is executed following the edge connection process described above, and determines whether or not the block of interest is focused.

When this process is executed, the CPU 160 first fetches the horizontal and vertical direction decided blur width DW of the block of interest set with the aforementioned edge connection process (step S700).

When two decided blur widths DW are fetched, the CPU 160 determines of these, if one of the decided blur widths DW is "Unknown" (step S710). With this determination, if it is determined that one of the decided blur widths DW is "Unknown" (step S710: Yes), then the block of interest edge pattern will not be similar to any of the basic edge patterns, and this block is uniformly judged to be "blurred block" (step S720).

Meanwhile, with the aforementioned step S710, if it is judged that none of the decided blur widths DW is "Unknown" (step S710: No), the CPU 160, of the two decided blur widths DW, specifies the decided blur width DW having the larger value as the maximum decided blur width MDW (step S730).

When the maximum decided blur width MDW is specified, the CPU 160 determines whether this maximum decided blur width MDW is larger than "0," and smaller than a specified blur width threshold value (e.g. "16") (step S740). As a result of this determination, if the maximum decided blur width MDW satisfies this condition, the block of interest is determined to be a "focused block" (step S750). In contrast to this, if the maximum decided blur width MDW is "0" or if it is the specified blur width threshold value or greater, the block of interest is determined to be a "blurred block" (step S720).

With the above process, when the determination ends of whether the current block of interest is a "focused block" or a "blurred block," that determination result is tabulated for each sub window (see FIG. 7) with step S170 of the blur determination process shown in FIG. 9. The focused block count tabulated in this way is stored in the focused block count buffer 172 of the RAM 170.

With the block blur determination process described above, of the horizontal direction decided blur width DW and the vertical direction decided blur width DW, the decided blur width DW for which the value is larger is specified as the maximum decided blur width MDW, and if this maximum decided blur width MDW is larger than the specified blur width threshold value, then the block of interest can be judged to be blurry.

Figure 22:
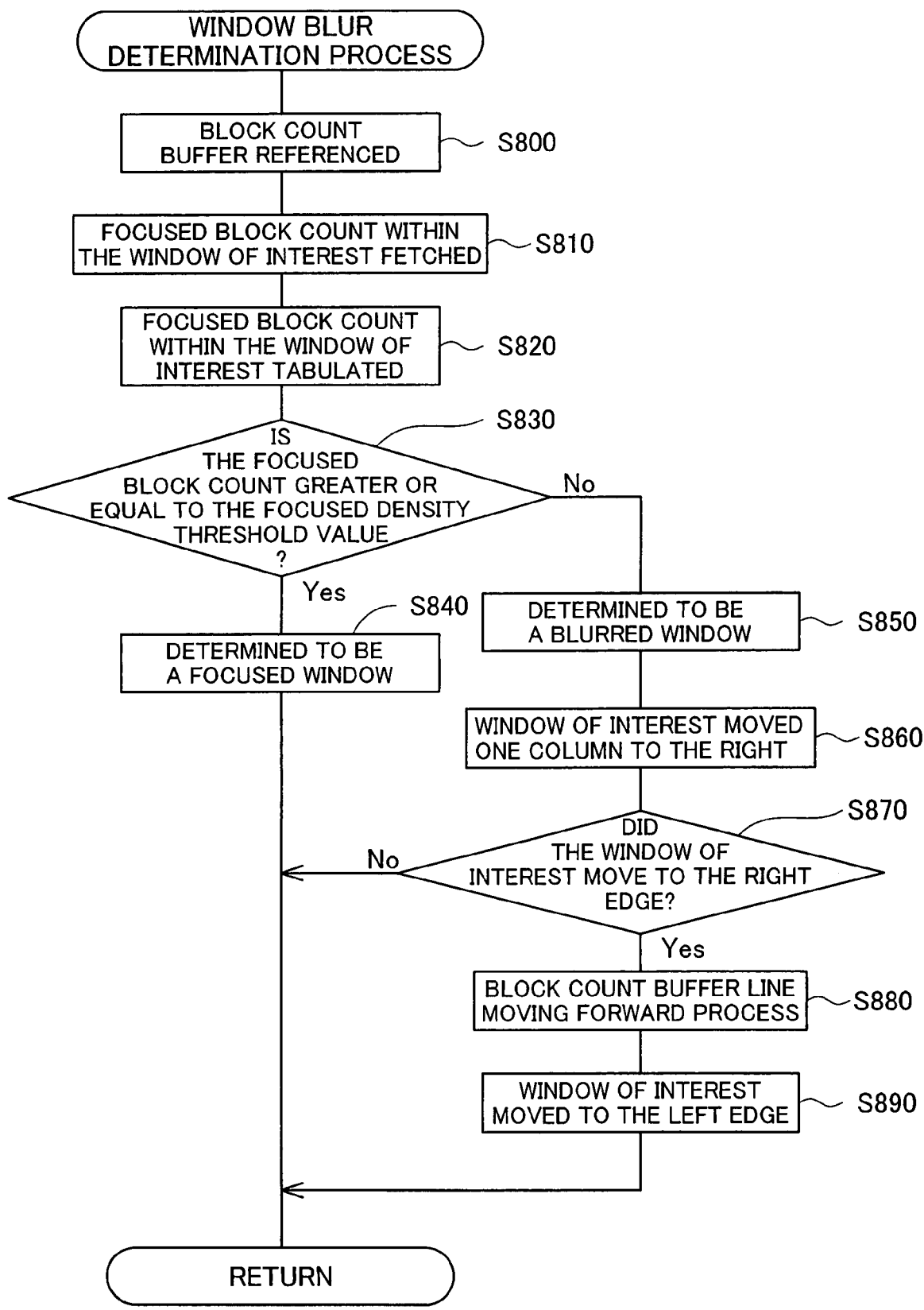
FIG. 22 is a detailed flow chart of the window blur determination process.

H. Window Blur Determination Process:

FIG. 22 is a detailed flow chart of the window blur determination process executed at step S190 of the blur determination process shown in FIG. 9. In contrast to the fact that the block blur determination process described above is for determining the presence or absence of blur for each block, this window blur determination process is for determining the presence or absence of blur for each window area shown in FIG. 7. This process is executed when the block blur determination process of all the blocks belonging to one sub window is complete.

When this process is executed, the CPU 160 first references the focused block count buffer 172 shown in FIG. 12 (step S800). Then, the cumulative value of the focused block count is fetched (step S810) for all the sub windows in the window area currently of interest (hereafter called the "window of interest"), and by combining these, tabulation is done of the count of all the focused blocks within the window area (step S820).

FIGS. 23A through 23F are explanatory drawings showing the method of moving the window area and the method of tabulating the focused block count. In FIG. 23A, in addition to showing the initial position of the window of interest, this also shows that the cumulative value of the focused block of the sub window of the upper left corner of the image is recorded as "3" according to the recording sequence of the focused block count shown in FIG. 12. In this case, with the aforementioned step S820, all of the focused block counts shown in the first column of the figure (0, 0, 0, 3) are added. When one window area contains 4×4 sub windows, and one sub window contains 7×7 blocks, if all the blocks in the window area are focused, then the total number of focused blocks for one window area is 784(=7×7×16).

The description returns to FIG. 22. With the aforementioned step S820, when the focused block count is tabulated, the CPU 160 determines whether that total number of focused blocks is a specified focused density threshold value (e.g. 400) or greater (step S830). As a result of this determination, if the total number of focused blocks is the focused density threshold value or greater (step S830: Yes), then the current window of interest is determined to be a "focused window" (step S840), and if it is less than the focused density threshold value (step S830: No), it is determined to be a "blurred window" (step S850).

When it is determined to be a "focused window" with the aforementioned step S840, the CPU 160 ends the window blur determination process. When this is done, the process advances to step S210 of the blur determination process of FIG. 9, and the entire image is determined to be a focused image. In contrast to this, with step S850, when it is determined to be a blurred window, the window of interest moves one column to the right in the focused block count buffer 172 (step S860). In FIG. 23B, shown is an example of the window moving by one column from FIG. 23A. Thereafter, with this process, the window of interest gradually moves to the right side as shown in FIGS. 23C and 23D. By working in this way, the number of focused windows tabulated at step S180 of the blur determination process of FIG. 9 is recorded at the lower right corner of the window area.

When the window of interest is moved by step S860, the CPU 160 judges whether that window area has moved to the right edge (step S870) as shown in FIG. 23E. With this process, if it is judged to not have moved to the right edge (step S870: No), the CPU 160 ends the concerned window blur determination process, and the process returns to step S200 of the blur determination process shown in FIG. 9.

In contrast to this, if it is judged that the window of interest has moved to the right edge (step S870: Yes), the process is performed of moving forward the line of the focused block count buffer 172 (step S880). This moving forward process is a process of moving forward the data of the fourth line of the focused block count buffer to the third line, the third line to the second line, and the second line to the first line. At this time, for the first line, simultaneous with moving forward that line to the fourth line, all the data of that line is initialized. In FIG. 23E, the status of this moving forward process is shown. As shown in FIG. 3 and FIG. 4, in contrast to the fact that reading of the blocks from the JPEG data basically starts from the upper left of the image, with this process, as shown in the drawing, the focused block count buffer 172 has data filled in sequence from the lowest line. Note that with this moving forward process, it is possible to move the data stored in the RAM 170 for each line, but it is also possible to sequentially replace the address pointer that references each line. If an item is used that uses a pointer in this way, it is possible to shorten the processing time because it is not necessary to move data within the RAM.

With the aforementioned step S880, after the lines of the focused block count buffer 172 are moved forward, the CPU 160 moves the window of interest to the left edge of the focused block count buffer 172 (step S890) as shown in FIG. 23F. When this is done, the next focused block count from the first column of the final line of the focused block count buffer 172 is recorded. When the window of interest is judged to be a "blurred window," by executing the processes from step S860 to step S890 described above, it is possible to move the window of interest relatively from the upper left to lower right within the image in units of one sub window.

I. Effect:

With the printer 100 of this embodiment described above, without extending JPEG data to a space area expressed by RGB, YCbCr or the like, it is possible to determine the presence or absence of blur at the stage that this is extended to the DCT coefficient that is a frequency area. Therefore, it is possible to perform the blur determination process at high speed. Also, with this embodiment, of the 8 pixel×8 pixel DCT coefficients, it is possible to determine the presence or absence of blur using only the total of 14 DCT coefficients constituting the first coefficient group and the second coefficient group shown in FIG. 5A, so it is possible to reduce the calculation volume.

Also, with this embodiment, rather than saving the first coefficient group and the second coefficient group as is in the RAM 170, basic edge patterns similar to the brightness change expressed by these coefficient groups are searched from the edge pattern table 181, and their pattern numbers are saved in the pattern number buffer 171 shown in FIG. 10, FIG. 11A or FIG. 11B. Because of that, it is possible to significantly reduce the memory capacity. For the areas in which the pattern numbers are saved as well, as shown in FIG. 10, FIG. 11A and FIG. 11B, only areas for which the blocks adjacent at the right side and bottom side of the block of interest for which a judgment of blur existence is to be made are prepared, so it is possible to dramatically reduce the used memory capacity.

Also, with this embodiment, the presence or absence of blur of the entire image is ultimately determined based on a specified window area that contains a plurality of blocks, but the focused block count buffer 172 used at this time is also prepared only in an amount of the number of lines of sub windows contained in the window area. Because of that, it is possible to reduce the used memory capacity.

Also, with this embodiment, with the edge connection process described above, it is possible to sequentially connect the blur widths of adjacent blocks, so even in cases when the width of the blur part in the image exceeds the 8×8 unit block size, it is possible to determine whether the image is blurred with good precision.

While the invention has been shown hereinabove in terms of a certain preferred embodiment, the invention is not limited to the embodiments herein and may assume various other arrangements without departing from the spirit thereof.

For example, with the aforementioned embodiment, the printer 100 performs blur determination, but it is also possible to have a computer perform blur determination by installing a program for executing the various processes described above in the computer.

Also, with the aforementioned embodiment, a case of one block size being 8×8 is showed, but the block size is not limited to this. Also, the size of the window area can be suitably set to the number of sub windows contained in one sub window.

Also, with the aforementioned embodiment, by sequentially moving the block of interest, the number of blocks read from the image data was suppressed to a minimum, but it is also possible to perform the edge connection process or block blur determination process or the like by storing pattern blocks after performing an edge pattern matching process for all the blocks contained in the image data and using the pattern number of the entire image stored in this way. By working in this way as well, it is not necessary to hold coefficient values for the entire image, so it is possible to reduce the memory use volume.

J. Other Aspects:

The present invention may be embodied in the following aspects. For example, in the image processing device described above, the edge pattern storage unit may further store correlated to each other the pattern number and a gradient width expressed by the basic edge patterns, and the blur width detection unit may read from the edge pattern storage unit the gradient width correlated to the pattern number of each block existing in the range that the gradient direction of the basic edge pattern matches, and calculates the blur width by adding the read gradient width.

With this kind of aspect, the gradient widths expressed by each of the basic edge patterns are stored in advance in the edge pattern storage unit, so it becomes possible to perform blur width detection calculation at high speed.

In the image processing device described above, the blur width detection unit may move the block of interest within the image data along the series of blocks, reference the pattern numbers associated respectively to the block of interest and the adjacent blocks of the movement destination of the block of interest, judge whether or not the gradient direction of the basic edge pattern of the block of interest and of the adjacent block match, and when the gradient direction does match, calculate the blur width by cumulatively adding the gradient width correlated to the block of interest pattern number.

With this kind of aspect, the block of interest is sequentially moved within the image, and the blur width is calculated while cumulatively adding the gradient width, so it is possible to reduce the used volume of memory required for calculating blur width.

In the image processing device described above, in the image data, the blocks are continuous in the horizontal direction and the vertical direction, the coefficient extraction unit may extract as the coefficient groups a first coefficient group representing horizontal direction frequency elements and a second coefficient group representing vertical direction frequency elements, the pattern matching unit may select the basic edge patterns respectively for the first coefficient group and the second coefficient group, the pattern number storage unit may store the pattern numbers corresponding to the selected two basic edge patterns, the blur width detection unit may calculate the blur width respectively for the horizontal direction and vertical direction, and the image processing device may further comprise the blur determination unit that determines the blur of the image represented by the image data based on the larger of the blur widths of the blur widths respectively calculated for the horizontal direction and vertical direction.

With this kind of aspect, it is possible to calculate the horizontal direction blur width and the vertical direction blur width for one block, so if the larger blur width of these is used, it is possible to determine the image blur with better precision.

In the image processing device described above, the blur width detection unit may save the gradient width cumulatively added for the horizontal direction in a horizontal cumulative buffer that holds one block, and save the gradient width cumulatively added for the vertical direction in a vertical cumulative buffer for holding one line of blocks, and when the block of interest is moved, by referencing these buffers, fetch the gradient widths of the horizontal and vertical directions accumulated in the block before moving by referencing these buffers.

With this kind of aspect, by providing a horizontal cumulative buffer that holds the cumulative value of one block and a vertical cumulative buffer that holds the cumulative value of one line of blocks which is the required minimum buffer, it is possible to accumulate the respective gradient widths for the horizontal direction and the vertical direction. As a result, it is possible to reduce the used memory volume.

In the image processing device described above, the pattern number storage unit may have a storage area that stores the pattern number for a first line containing the block of interest and a second line containing the adjacent block under the block of interest, and when the block of interest is moved to the right edge of the line in which the block of interest exists, by moving forward the pattern number stored from the second line and thereafter to the respective previous line, the pattern number of the block selected next is stored in an empty space of the storage area.

With this kind of aspect, rather than the pattern numbers of the entire image, it is possible to store the pattern numbers only for the line in which the block adjacent to the block of interest is contained, so it is possible to significantly reduce the used memory capacity.

In the image processing device described above, it is also possible to have it such that the blocks are stored for each n (n is an integer of 1 or greater) lines in the image data, and the pattern number storage unit is provided with a storage area in which it is possible to store the pattern numbers of (n+1) lines of the block.

With this kind of aspect, it is possible to store the minimum required pattern numbers according to the unit line count for which blocks are recorded in the image data, so it is possible to reduce the memory capacity. Note that if the image data is data based on the JPEG standard, the blocks are recorded in one line or two line units, so it is possible for the pattern number storage unit to prepare a storage area in which two lines or three lines of pattern numbers can be stored. Which of the line count units the blocks are recorded by can be determined by analyzing the header information of the JPEG data.

In the image processing device described above, the image processing device may further comprises: a block blur determination unit that determines the presence or absence of blur for each of the blocks based on the blur width and a specified threshold value; a window blur determination unit that tabulates the presence or absence of blur according to the block blur determination unit for all the blocks contained in a specified window area in the image data and that determines whether or not it is blurry within the window area based on the tabulated results and a specified threshold value; and an image blur determination unit that, as a result of the window area moving within the image data, when there is the window area for which it is judged that there is at least one location that is not blurry, judges that the overall image represented by the image data is not blurry.

With this kind of aspect, it is possible to determine the presence or absence of blur for each window area constituted by a plurality of blocks, so it is possible to determine whether or not blur has occurred for an image with precision closer to that of human sensitivity. As the specified window area, for example, when it is assumed that the image data will be printed on an L size printing paper, it is possible to have this be an area of 1 cm×1 cm or 2 cm×2 cm. This is because if it is judged that within this size window area, none of the locations in the image is blurred, it is possible to judge that the area is in focus.

In the image processing device described above, the window area is further partitioned by a plurality of sub windows larger than the size of the block, the block blur determination unit may tabulate the presence or absence of blur for each block for each of the sub windows containing the blocks, and the window blur determination unit, by further tabulating the tabulation values tabulated for the sub windows for all the sub windows contained in the window area, may perform the tabulation of the presence or absence of the blur for all the blocks contained in the window area.

With this kind of aspect, it is possible to tabulate the presence or absence of blur step by step from block to sub window, and from sub window to window area, so it is possible to tabulate the presence or absence of blur efficiently.

In the image processing device described above, it is also possible to have it such that the image blur determination unit moves the window area in the image data by a movement distance of the sub window unit.

With this kind of aspect, the window area moves in sub window unit movement distances, so it is easy to tabulate the presence or absence of blur within a window area. In addition, it is possible to detect the blurred window area with better precision than moving in window area unit.

In the image processing device described above, it is also possible to have it such that further comprised is a tabulated value storage unit that stores the tabulated value of the presence or absence of blur for each of the sub windows tabulated by the block blur determination unit, and the tabulated value storage unit has a storage area that stores the tabulated values for the number of lines of the sub windows contained in the window area, and when the window area is moved to the bottom side in the image data, the tabulated values stored for each line of the storage area are moved up to the previous line by the number of the moved lines, and the tabulated value for each of the sub windows contained within the moved window area is stored in an empty space of the storage area that occurred with the moving up.

With this kind of aspect, it is possible to prepare as the tabulated value storage unit the memory capacity only in the amount necessary for tabulating the presence or absence of blur within the window area, so it is possible to reduce the used memory capacity.

In the image processing device described above, the image processing device may further comprises a blur determination unit that determines the blur of the image expressed by the image data based on the detected blur width and a presentation unit that presents to users images determined not to be blurry by the blur determination unit.

With this kind of aspect, the user is able to confirm only the images which were shot successfully. As a method of presentation to the user, for example, it is possible to display images in the display device. In addition, it is also possible to print a list of images determined not to be blurry and present that to the user.

In the image processing device described above, it is also possible to have it such that further comprised is a printing unit that prints images selected by the user from among the presented images.

With this kind of aspect, the user is able to easily print desired images form among successfully shot images without being conscious of the images for which blur occurred in the image due to hand shaking or subject shaking.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device that processes an image constituted as a collection of blocks consisting of a plurality of pixels, the image processing device comprising:
   an image data input unit that inputs image data constituted by recording for each of the blocks a coefficient obtained by converting a space area to a frequency area performed using the blocks as a unit;
   an edge pattern storage unit that stores correlated to each other a basic edge pattern for which a gradient shape representative of a change in the pixel values within the block is expressed by the coefficient, and a pattern number uniquely allocated to the basic edge pattern;
   a coefficient extraction unit that extracts a coefficient group that express frequency elements of a specified direction from each block of the input image data;
   a pattern matching unit that selects from the edge pattern storage unit the basic edge pattern similar to the gradient shape expressed by the extracted coefficient group;
   a pattern number storage unit that stores the pattern number corresponding to the selected basic edge pattern, wherein the pattern number is associated with the block; and
   a blur width detection unit that references the pattern number stored in the pattern number storage unit, and detects the blur width based on a range for which a basic edge pattern gradient direction matches along a series of the blocks within the image.

2. An image processing device according to clam 1, wherein
   the edge pattern storage unit further stores correlated to each other the pattern number and a gradient width expressed by the basic edge patterns, and
   the blur width detection unit reads from the edge pattern storage unit the gradient width correlated to the pattern number of each block existing in the range that the gradient direction of the basic edge pattern matches, and calculates the blur width by adding the read gradient width.

3. An image processing device according to claim 2, wherein
the blur width detection unit moves a block of interest within the image data along the series of blocks, references pattern numbers associated respectively to the block of interest and adjacent blocks of a movement destination of the block of interest, judges whether or not the gradient direction of the basic edge pattern of the block of interest and of the adjacent block match, and when the gradient direction does match, calculates the blur width by cumulatively adding the gradient width correlated to the block of interest pattern number.

4. An image processing device according to claim 3, wherein
in the image data, the blocks are continuous in the horizontal direction and the vertical direction,
the coefficient extraction unit extracts as the coefficient groups a first coefficient group representing horizontal direction frequency elements and a second coefficient group representing vertical direction frequency elements,
the pattern matching unit selects the basic edge patterns respectively for the first coefficient group and the second coefficient group,
the pattern number storage unit stores the pattern numbers corresponding to the basic edge patterns selected for the first coefficient group and the second coefficient group,
the blur width detection unit calculates the blur width respectively for the horizontal direction and vertical direction, and
the image processing device further comprises a blur determination unit that determines the blur of the image represented by the image data based on the larger of the blur widths of the blur widths respectively calculated for the horizontal direction and vertical direction.

5. An image processing device according to claim 4, wherein
the blur width detection unit saves the gradient width cumulatively added for the horizontal direction in a horizontal cumulative buffer that holds one block, and saves the gradient width cumulatively added for the vertical direction in a vertical cumulative buffer for holding one line of blocks, and when the block of interest is moved, by referencing the horizontal cumulative and vertical cumulative buffers, fetches the gradient widths of the horizontal and vertical directions accumulated in the block before moving by referencing the horizontal cumulative and vertical cumulative buffers.

6. An image processing device according to claim 4, wherein
the pattern number storage unit has a storage area that stores the pattern number for a first line containing the block of interest and a second line containing the adjacent block under the block of interest, and when the block of interest is moved to a right edge of the line in which the block of interest exists, by moving forward the pattern number stored from the second line and thereafter to a respective previous line, the pattern number of the block selected next is stored in an empty space of the storage area.

7. An image processing device according to claim 6, wherein
the blocks are recorded for each n (n is an integer of 1 or greater) lines in the image data, and
the pattern number storage unit is provided with a storage area in which it is possible to store the pattern numbers of (n+1) lines of the block.

8. An image processing device according to claim 1, further comprising:
a block blur determination unit that determines a presence or absence of blur for each of the blocks based on the blur width and a specified threshold value;
a window blur determination unit that tabulates the presence or absence of blur according to the block blur determination unit for all the blocks contained in a specified window area in the image data and that determines whether or not it is blurry within the window area based on the tabulated results and a specified threshold value; and
an image blur determination unit that, as a result of the window area moving within the image data, when there is the window area for which it is judged that there is at least one location that is not blurry, judges that the overall image represented by the image data is not blurry.

9. An image processing device according to claim 8, wherein
the window area is further partitioned by a plurality of sub windows larger than the size of the block,
the block blur determination unit tabulates the presence or absence of blur for each block for each of the sub windows containing the blocks, and
the window blur determination unit, by further tabulating the tabulation values tabulated for the sub windows for all the sub windows contained in the window area, performs the tabulation of the presence or absence of the blur for all the blocks contained in the window area.

10. An image processing device according to claim 9, wherein
the image blur determination unit moves the window area in the image data by a movement distance of a sub window unit.

11. An image processing device according to claim 10, further comprising:
a tabulated value storage unit that stores the tabulated value of the presence or absence of blur for each of the sub windows tabulated by the block blur determination unit,
wherein the tabulated value storage unit has a storage area that stores the tabulated values for a number of lines of the sub windows contained in the window area, and when the window area is moved to a bottom side in the image data, the tabulated values stored for each line of the storage area are moved up to a previous line by a number of moved lines, and the tabulated value for each of the sub windows contained within the moved window area is stored in an empty space of the storage area that occurred with the moving up.

12. An image processing device according to claim 1, further comprising:
a blur determination unit that determines the blur of the image expressed by the image data based on the detected blur width; and
a presentation unit that presents to users images determined not to be blurry by the blur determination unit.

13. An image processing device according to claim 12, further comprising a printing unit that prints images selected by the users from among the presented images.

14. An image processing device according to claim 1, wherein the image data is JPEG format image data.

15. A method for processing an image constituted as a collection of blocks consisting of a plurality of pixels, the method comprising:

inputting image data constituted by recording for each of the blocks a coefficient obtained by converting a space area to a frequency area performed using the blocks as a unit;

extracting a coefficient group that express frequency elements of a specified direction from each block of the input image data;

referencing an edge pattern storage unit that stores correlated to each other a basic edge pattern for which a gradient shape representative of a change in the pixel values within the block is expressed by the coefficient, and a pattern number uniquely allocated to the basic edge patterns;

selecting the basic edge pattern similar to the gradient shape expressed by the extracted coefficient group;

storing the pattern number corresponding to the selected basic edge pattern, wherein the pattern number is associated with the block; and referencing the pattern number stored in the edge pattern storage unit and detecting blur width based on a range for which a basic edge pattern gradient direction matches along a series of the blocks within the image.

16. A non-transitory computer program product for processing an image constituted as a collection of blocks consisting of a plurality of pixels, the computer program product comprising:

a non-transitory computer readable medium; and a computer program stored on the non-transitory computer readable medium, the computer program causing a computer to implement the functions of:

inputting image data constituted by recording for each of the blocks a coefficient obtained by converting a space area to a frequency area performed using the blocks as a unit;

extracting a coefficient group that express frequency elements of a specified direction from each block of the input image data;

referencing an edge pattern storage unit that stores correlated to each other a basic edge pattern for which a gradient shape representative of a change in the pixel values within the block is expressed by the coefficient, and a pattern number uniquely allocated to the basic edge pattern;

selecting the basic edge pattern similar to the gradient shape expressed by the extracted coefficient group;

storing the pattern number corresponding to the selected basic edge pattern, wherein the pattern number is associated with the block; and referencing the pattern number stored in the edge pattern storage unit and as detecting blur width based on a range for which a basic edge pattern gradient direction matches along a series of the blocks within the image.

* * * * *